United States Patent [19]
Farrell et al.

[11] Patent Number: 5,160,190
[45] Date of Patent: Nov. 3, 1992

[54] MOVABLE STORAGE SYSTEM WITH AISLE MONITORING APPARATUS

[75] Inventors: Richard B. Farrell, New York, N.Y.; David P. Orlowski, Clinton, Mich.

[73] Assignee: Automated Storage & Retrieval Systems of America Inc., New York, N.Y.

[21] Appl. No.: 703,188

[22] Filed: May 20, 1991

[51] Int. Cl.⁵ ............................................. A47B 88/00
[52] U.S. Cl. .................................................. 312/201
[58] Field of Search ................. 340/552; 312/201, 198

[56] References Cited

U.S. PATENT DOCUMENTS

| | | |
|---|---|---|
| 3,957,322 | 5/1976 | Mastronardi et al. . |
| 3,957,323 | 5/1976 | Tucker et al. . |
| 4,033,649 | 7/1977 | Naito et al. . |
| 4,256,355 | 3/1981 | Yamaguchi et al. . |
| 4,307,922 | 12/1981 | Rhodes, Jr. . |
| 4,412,772 | 11/1983 | Naito et al. . |
| 4,422,816 | 12/1983 | Naito et al. . |
| 4,437,711 | 3/1984 | Dahnert . |
| 4,604,735 | 8/1986 | Parsons .......................... 340/552 X |
| 4,733,923 | 3/1988 | Dahnert . |
| 4,744,307 | 5/1988 | Peterman et al. . |
| 4,745,516 | 5/1988 | Griffin . |
| 4,783,618 | 11/1988 | Artrip . |
| 5,069,513 | 12/1991 | Farrell et al. ...................... 312/201 |

Primary Examiner—Joseph Falk
Attorney, Agent, or Firm—Rosen, Dainow & Jacobs

[57] ABSTRACT

A detection system is disclosed for a mobile storage system which causes the storage system to prevent movement of a storage element whenever a person is detected in an aisle between storage elements. The detection system uses a presence or motion detector for detecting the presence of a person in an open aisle without direct contact between the person and the detection system. Preferably, a radar transceiver operating in X-band is positioned to overlie each open aisle to detect presence of movement of a person in an open aisle, even slight movement such as breathing. The storage system in which the detection system is connected prevents any closing movement of a storage element adjacent an aisle in which a person is detected so as to avoid frightening the person in the aisle.

23 Claims, 16 Drawing Sheets

FIG. 6

C = CLOSED
O = OPEN
I = INACTIVATED
A = ACTIVATIVED

| | AISLE 1-2 | MONITOR $110_{1-2}$ | AISLE 2-3 | MONITOR $110_{2-3}$ | AISLE 3-4 | MONITOR $110_{3-4}$ | RANGE CONTROL SWITCH | MOTOR | REMARKS |
|---|---|---|---|---|---|---|---|---|---|
| STATE_0 (Initial) | C | OFF | O | ON | C | OFF | I | DISABLED | Fig. 7A |
| STATE_1 (Person_2 Enters Aisle 2-3) | C | OFF | O | ON DETECTS Person_1 | C | OFF | I | DISABLED | Fig. 7A |
| STATE_2 (Person_2 Activates Range Control Switch To Open Aisle 1-2) | C | OFF | O | ON DETECTS Person_1 | C | OFF | A | DISABLED | Fig. 7A |
| STATE_3 (Same as State_2 But Person_1 Has Just Exited Aisle) | C | OFF | O | ON TIME NOT YET TIMED OUT | C | OFF | A | DISABLED | Fig. 7A |
| STATE_4 (Same As STATE_3 But Timer Has Timed Out) | Opening | ON (or OFF doesn't matter) | Closing | OFF | C | OFF | A | ENABLED | Fig. 7B |
| STATE_5 (Same As STATE_4 But Aisle 2-3 Closed, Aisle 1-2 Now Open) | O | ON | C | OFF | C | OFF | I | DISABLED | Fig. 7C |

MOVABLE STORAGE SYSTEM WITH AISLE MONITORING APPARATUS

RELATED APPLICATION

Application Ser. No. 703,178, entitled FIELD DISTURBANCE MONITOR SYSTEM, filed concurrently herewith, describes in more detail the detection means disclosed herein. The disclosure of said application Ser. No. 703,178 is hereby incorporated herein by reference.

BACKGROUND OF THE INVENTION

The invention disclosed herein relates to a storage module or system having storage elements or storage ranges at least one of which is movable so as to open and close at least one access aisle adjacent a storage range, and in particular to providing aisle safety in such a storage system to prevent an aisle from being closed when a person is in the aisle.

Copending U.S. patent application Ser. No. 07/505,248, filed Apr. 3, 1990, entitled "AUTOMATIC LOCKING DEVICE FOR MOVABLE SHELVING", copending U.S. patent application Ser. No. 07/589,322, filed Sep. 27, 1990, entitled "MOBILE SHELVING SAFETY FLOOR", U.S. Pat. Nos. 4,033,649, 4,412,772 and 4,422,816 (all Naito et al.) and U.S. Pat. No. 4,256,355 (Yamaguchi et al.) describe mobile shelving systems employing movable storage ranges in the form of wheeled carriages supporting storage shelving or racks. The carriages ride on rails so as to be movable to open aisles in which a person may enter to access stored items on the carriage or carriages adjacent an open aisle. The disclosures of patent application Ser. Nos. 07/505,248 and 07/589,322 and the disclosures of U.S. Pat. Nos. 4,033,649, 4,412,772, 4,422,816 and 4,256,355 are hereby incorporated herein by reference.

Mobile storage systems of the type disclosed in those patent applications and patents may employ a control system having user operable controls located at the entrance to each aisle for activating and/or controlling the mechanical arrangements or motors that move the ranges. Such mobile storage systems may also include apparatus connected therein and cooperating therewith to prevent or stop aisle closing movement of a storage range when a person is present in an open aisle. For example, the Naito et al. '772 and '649 patents, the Yamaguchi et al. '355 patent and said U.S. patent application Ser. No. 07/505,248 disclose mobile storage systems comprising a manually-activated control or device at the end of each storage range which when activated cause a range or ranges adjacent an open aisle to be locked. However, such range locking is not failsafe and may be overridden mistakenly by a person who is unaware that another person may be in the open aisle.

U.S. Pat. No. 3,957,323 (Tucker et al.) and the Naito et al. '772 and '649 patents disclose mobile storage systems which include safety bars connected in and cooperating with the storage system to stop movement of a range when a bar contacts an object or a person. However, safety devices such as those safety bars which are connected to stop movement of a storage range after the range has started closing the aisle have the disadvantage that the closing movement of the range may frighten a person in the open aisle.

U.S. Pat. No. 4,744,307 (Peterman et al.), the Tucker et al. '323 patent and said application Ser. No. 07/589,322 disclose switches for mobile storage systems activated by depression of a movable floor section in an open aisle by a person standing on the floor section. The switches are connected in and cooperate with the mobile storage system such that activation of a switch associated with a movable floor section in an open aisle prevents a storage range from closing the open aisle in which the person is standing. However, providing this type of aisle safety requires a raised safety floor, which adds to the cost of the mobile storage system and the installation cost, and which reduces the usable height in the storage area which can be a serious problem in storage areas with limited ceiling height.

U.S. Pat. No. 4,783,618 (Artrip) discloses a mobile storage system comprising a beam radiator and a beam detector located at the entrance of an aisle which are connected in and cooperate with the storage system to prevent an aisle from being closed depending upon the sequence in which radiation is detected. However, devices of that type may nonetheless frequently permit a storage range to commence closing an aisle when a person is present in the aisle. Storage ranges in systems of that type may contain various mechanisms and controls located on the range a convenient height above the floor at the aisle entrance so that mounting the beam radiator and detector at the same convenient height and location as other mechanisms and controls on the range at the aisle entrance may present a space allocation problem.

SUMMARY OF INVENTION

An object of the invention disclosed herein is to enhance the safety of a mobile storage system.

Another object of the invention is to provide improved safety in a mobile storage system against an aisle closing with a person present in the aisle.

Another object of the invention is to provide such aisle safety by reliably detecting a person in an open aisle over effectively the entire space of the open aisle in which a person is expected to be present.

Another object of the invention is to provide such aisle safety by reliably detecting a person in the aisle in substantially any position in the aisle, whether the person is still or moving, over effectively the entire space of the aisle in which a person is expected to be present.

Another object of the invention is to provide for such aisle safety without requiring direct contact between the storage system and a person in an open aisle.

Another object of the invention is to provide for such aisle safety without interfering with normal usage of the storage system, and/or without requiring a person to set or activate any controls, and/or so as not to take up space on those areas of the storage elements to which other components, controls, etc. are typically mounted.

Another object of the invention is to provide such aisle safety in a mobile storage system without utilizing a safety floor.

In accordance with the invention, it was recognized that a person in an open aisle of a mobile storage system of the type described above may remain motionless for several minutes at a time, for example when reading a page from a book or file, and that effective aisle safety must reliably detect such person in an open aisle and prevent a storage element or elements from closing on a person in an open aisle. However, further in accordance with the invention, it was recognized that a person is seldom if ever perfectly motionless and that the small body movements that inevitably occur with a live person over periods of time of only seconds when detected would provide a reliable indication of the presence of a person in an open aisle without direct contact with the person.

In accordance with the invention, a person's presence within a given space in an open aisle of a mobile storage system is detected without direct contact with the person as long as there is some movement of the person, even slight movement such as breathing, body weight shifting, head movement, etc. When a person's presence is so detected in an open aisle, the movable storage element or elements adjacent an open aisle are prevented from moving to close the aisle. The given space is essentially the entire aisle space in which a person is reasonably expected to be, with the possible exception of the aisle ends where a person need not be detected since a person near the end of an open aisle may easily step out of the aisle if a range begins to move. Thus, the given space is effectively the entire space of the aisle in which a person is expected to be, and a person's presence therein is detected even if the person does not walk in the aisle or move his arms or legs, etc.

According to the invention, a monitor or detector detects a person's presence in an open aisle without direct contact between the person and the monitor and in response thereto, the storage system prevents a storage element or elements from moving to close the aisle in which a person has been detected.

Preferably, radiated energy in an active or passive monitor system is employed to detect the presence of a person in an aisle without direct contact between the person and the monitor system.

In an active monitor system, energy is radiated by the monitor system into a detection field, and reflected energy (or the lack of it) is used to detect presence. In a passive monitor system, a receiver receives energy from a field of detection and determines whether a person is present in the detection field. Passive systems may detect infrared energy or light energy, etc., radiated from within the detection field but not transmitted by the passive monitor system.

In a specific embodiment, an active monitor system radiates energy within the given space in an open aisle and detects and processes reflected energy to determine whether a person is present within the given space.

In the preferred embodiment, a variation in the reflected energy or field pattern resulting from movement of a person, even slight movement, within the given space in the aisle is employed to detect presence.

In accordance with an embodiment of the invention, a radiated energy, field disturbance monitor or detector detects the presence of a person in an open aisle of a mobile storage system. In the preferred embodiment, the radiated energy, field disturbance monitor is a radar system that transmits radar pulses and monitors for a change in the reflected signal as an indication of the presence of a person in an open aisle. Preferably, the radar system utilizes radiated energy in the microwave frequency spectrum.

The radar system according to the preferred embodiment of the invention may be calibrated for a certain level of reflected radiation in an empty open aisle, and any movement in that aisle even slight movement causes a phase shift in the reflected signals. The radar system is sufficiently sensitive that even a small phase shift will cause a major, easily detected change within the radar system. Thus, a person's presence may be detected through almost any kind of movement, however slight, within the open aisle.

While other kinds of non-direct contact motion or presence detectors may be suitable for use in accordance with the invention, a microwave radar system is preferred for a number of reasons. Since the metal shelving typically used in commercial mobile storage systems acts as a wave guide for the microwave radiation, the radiation remains confined between the adjacent storage ranges in the open aisle, and the radiation pattern is not substantially affected by the nature and presence density of the things on the shelves. Very little radiated power, as little as 7 mw with the preferred radar system, is required to detect a person regardless of whether a person is moving or still as long as there is slight movement. Such low microwave power is not likely to be of concern from a health standpoint and is in compliance with applicable Federal Communication Commission regulations. Since the radiation pattern of the preferred microwave radar system may easily be adjusted as described below, the radiation pattern can be modified to substantially fill the entire aisle space between storage ranges whose length (down the aisle) can vary from 12-21 feet and whose heights may also vary. Hence, the same radar system may perform satisfactorily with a large variety of mobile storage systems.

The mobile storage system according to the preferred embodiment includes a module control system with which the monitor is coupled according to the invention such that an open aisle within which the presence of a person is detected by the monitor is prevented by the module control system from being closed. Preferably, the mobile storage system, upon detection of a person's presence within an open aisle, prevents any closing movement whatsoever of a storage element adjacent the open aisle, and more preferably, prevents movement of all storage elements in the concerned module. Thereby, the possibility of a storage element starting to move to close an aisle in which a person is located is avoided, and with it the possibility of frightening the person in the aisle.

BRIEF DESCRIPTION OF THE DRAWINGS

The invention is illustrated by way of example and not limitation in the figures of the accompanying drawings in which like references denote like or corresponding parts, and in which:

FIG. 6 is a state diagram illustrating operation of the storage system of FIG. 1 in accordance with the invention;

DESCRIPTION OF PREFERRED EMBODIMENTS

Figure 1:
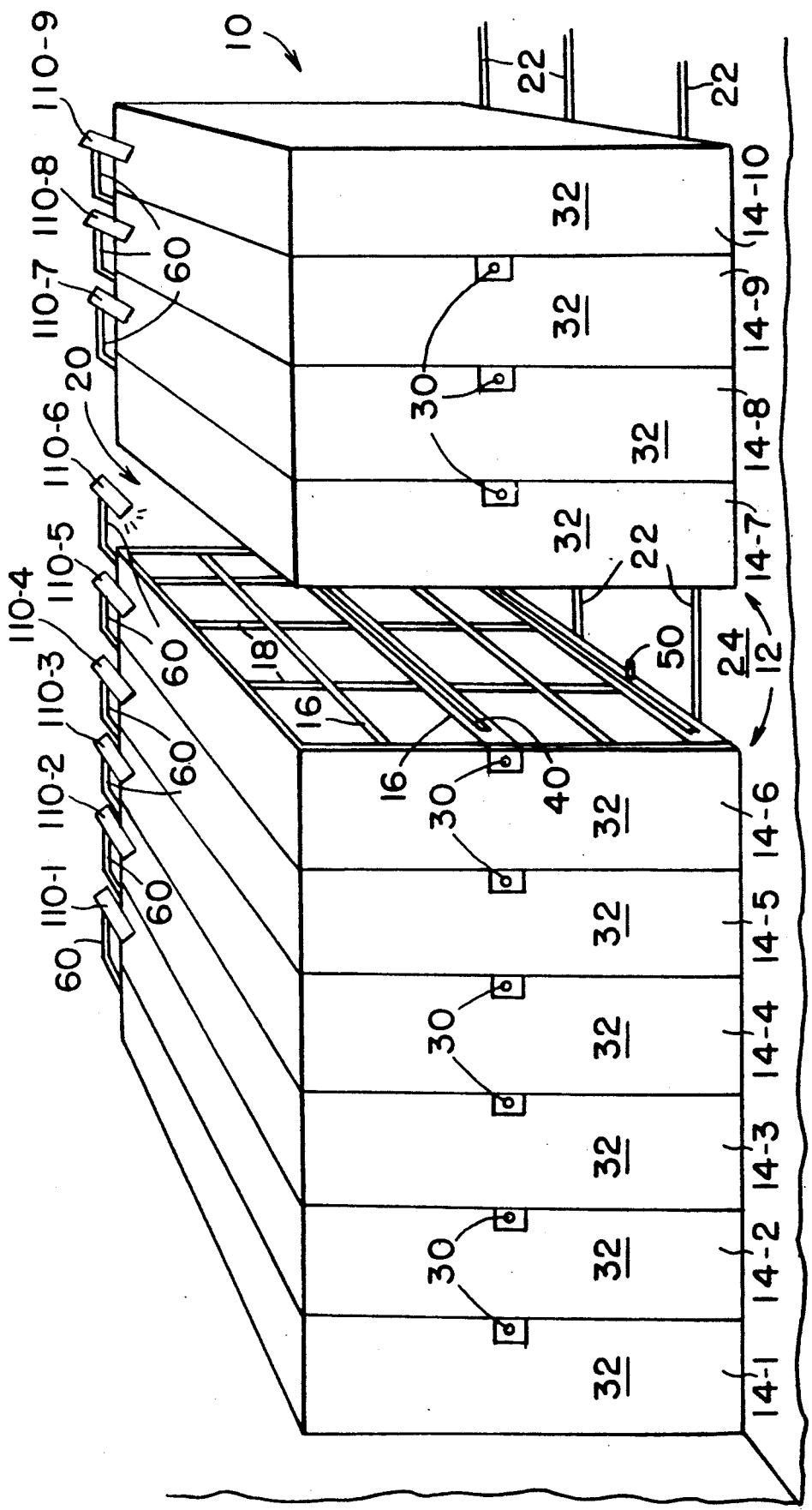
FIG. 1 is a perspective view of a mobile storage system according to the invention showing schematically the personnel detectors or monitors according to the invention.

FIG. 1 shows a mobile storage system 10 in the form of a shelving installation. System 10 comprises a single module 12 of ten storage elements or ranges or carriages designated generally or generically by 14 and individually by 14-1 through 14-10. Ranges 14 include means formed, for example, by shelves 16 and vertical partitions 18 for holding various things such as files or books. Nine ranges 14 (14-2 through 14-10) are movable to selectively form an aisle 20, and for that purpose are provided with wheels (not shown) on the bottoms thereof to form carriages. Mounting rails 22 are mounted on the floor 24 along which the movable carriages 14 may be moved. A mechanical driving mechanism (not shown) or an electrical motor and gearing (not shown) may be provided to move each movable range 14. In the preferred embodiment of the present invention, electrical motors are used to move the movable ranges 14 to open and close access aisles 20 between adjacent ranges 14.

Figure 2:
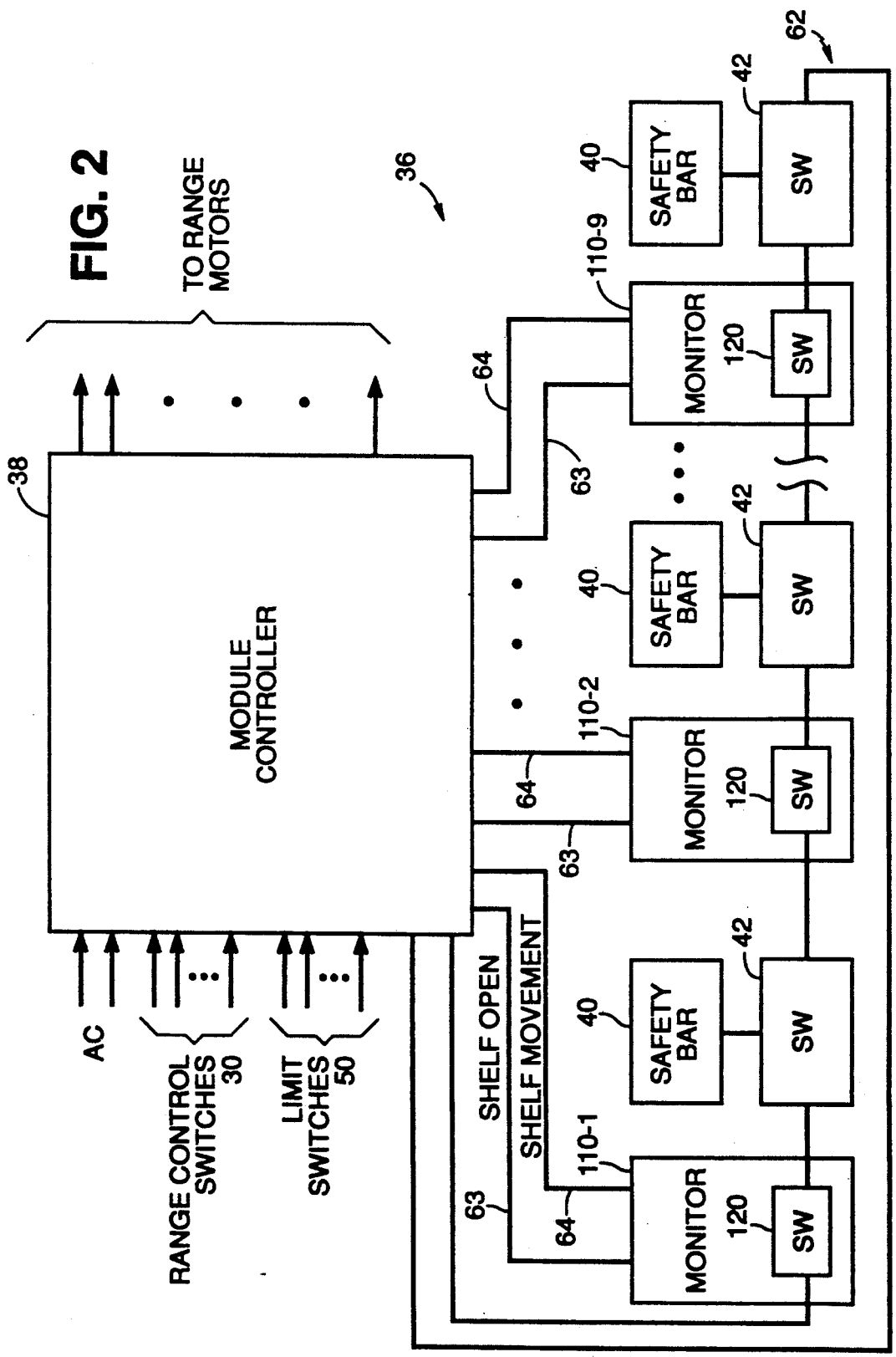
FIG. 2 is a block diagram of the module control system of the mobile storage system of FIG. 1.

An electrical range control switch 30 is provided on the end panel 32 of nine of the ranges 14-1 through 14-9. The switches 30 are located adjacent one corresponding side of the ranges and are coupled in a module control system 36 (FIG. 2). A person may open a desired aisle by activating a range control switch 30 adjacent the desired aisle location, provided that, among other things, a person is not detected in an open aisle. In the course of opening a new aisle, ranges other than the two have to be moved, and an already open aisle may have to be closed. To prevent an aisle from closing when a person is present in the aisle, mobile storage system 10 includes nine personnel detectors or monitors designated generally or generically by 110 and individually by 110-1 through 110-9 coupled to module controller 38 (FIG. 2) in module control system 36 for detecting a person or object in an open aisle. Module control system 36 (FIG. 2) prevents an aisle from closing when a detector 110 detects a person or object in that open aisle. Thus, module control system 36 only opens an aisle, upon request indicated by activation of a range control switch 30, if the status of the detector 110 for the open aisle indicates that no person is present in the open aisle.

Mobile storage system 10 includes conventional safety bars 40 (FIG. 1) which extend along corresponding sides of each range 14 at two different heights, and are linked to electrical switches referenced generally by 42 (FIG. 2) connected in module control system 36. Should a range 14 move to close an aisle 20 with a person in it, a safety bar 40 will touch the person (or an object) present in the open aisle 20 and open the associated switch 42 and cause module control system 36 to disable the motors for all storage elements 14 and stop movement thereof.

Mobile storage system 10 also includes conventional limit switches 50 (FIG. 1) which become activated whenever a range moves into or out of contact with the adjacent range. Limit switches 50 are coupled to module controller 38 (FIG. 2) and activation thereof is used by module control system 36 as described herein for enabling and disabling monitors 110 and for control functions as described in the referenced patents.

The Naito et al. '649, '772 and '816 Patents disclose mobile storage systems which include a module control system comprising range control switches 30 and safety bars 40 and associated switches 42, and limit switches 50 which control motors for the ranges according to conventional sequences, e.g., disabling one or more motors when a safety bar 40 is activated. Mobile storage system 10 herein, including ranges 14 and the physical mounting thereof on tracks 22, a module control system 36 and electrical motors for moving the ranges may be conventional, as modified by monitors 110 and the cooperation thereof with module control system 36. Therefore, details of the module control system 36, and connection thereto of range control switches 30, safety bars 40, switches 42, limit switches 50, the electrical motors and the module controller 38 are omitted and may be as described in the Naito et al. '649 and '772 Patents.

Personnel detectors or monitors 110 (FIGS. 1 and 2) are positioned to monitor all open aisles for the presence of a person therein. One or more monitors 110 may be supported in fixed locations or movable so as to monitor each and every aisle that is opened in mobile storage system 10. For example, as depicted in FIG. 1, a number of monitors 110 may be suspended from ranges 14 by supports 60 so as to be positioned to monitor any aisle that may be opened. In the embodiment illustrated in FIG. 1, a monitor 110 is supported by stationary range 14-1 and by movable ranges 14-2 through 14-9 above the top of the respective range spaced to one side of the range by about one-half the width of an aisle. The exact height and spacing may vary depending on the particular installation, but the height is typically sufficiently above floor level so as not to interfere with ordinary movement of a person in an open aisle, e.g., above about 6.5 feet.

A respective monitor 110 according to the invention, when enabled, detects the presence of a person in a respective open aisle who makes any slight movement such as breathing or weight-shifting, etc. Referring to FIG. 2, each monitor 110 includes a switch 120 coupled to module control system 36 so that module control system 36 disables the motors to all movable ranges when any monitor 110 has detected a person in an open aisle. Each monitor 110 is coupled in a loop 62 (FIG. 2) to module controller 38, and receives "shelf open" and "shelf movement" control signals on lines 63 and 64, respectively, from module controller 38. For example, the shelf open and shelf movement signal may be derived by module controller 38 based on activation of a limit switch or limit switches 50 when a range or ranges moves away from or into contact with an adjacent range or ranges. The shelf open and shelf movement signals are used to enable or disable a monitor 110 as described below. A switch 120 is closed to complete loop 62 when the corresponding monitor 110 is disabled or if enabled has not detected the presence of a person in an open aisle. In response to an open switch 120 or 42 in loop 62, indicating, respectively, detection of a person in an open aisle by monitor 110 or activation of a safety bar 40, module controller 38 cuts off power to the range motors as described below.

Switches 120 and 42 in loop 62 (FIG. 3) are coupled to module controller 38 to control power to the range motors. For example, as shown schematically in FIG. 3, switches 120 and 42 may be connected in a series circuit 62 with a source of power and the coil 65 of another relay 66 which controls power to the range motors via switch 67 and control circuitry 68. When any monitor switch 120 or safety bar switch 42 is opened in loop 62, power to coil 65 is interrupted, which opens switch 67 and cuts off AC power to the motors for the ranges 14. When a monitor 110 is enabled, the state of its corresponding switch 120 is controlled via the coil of relay K1 by the monitor 110 in dependence upon whether the monitor detects the presence of a person or not. The motors for the ranges are normally disabled by control circuitry 68 of module controller 38. Upon activation of a range control switch 30, module control circuitry 68 will enable the appropriate motors to move the appropriate ranges unless the presence of a person is detected by an enabled monitor 110 in an open aisle to be closed.

Figure 3:
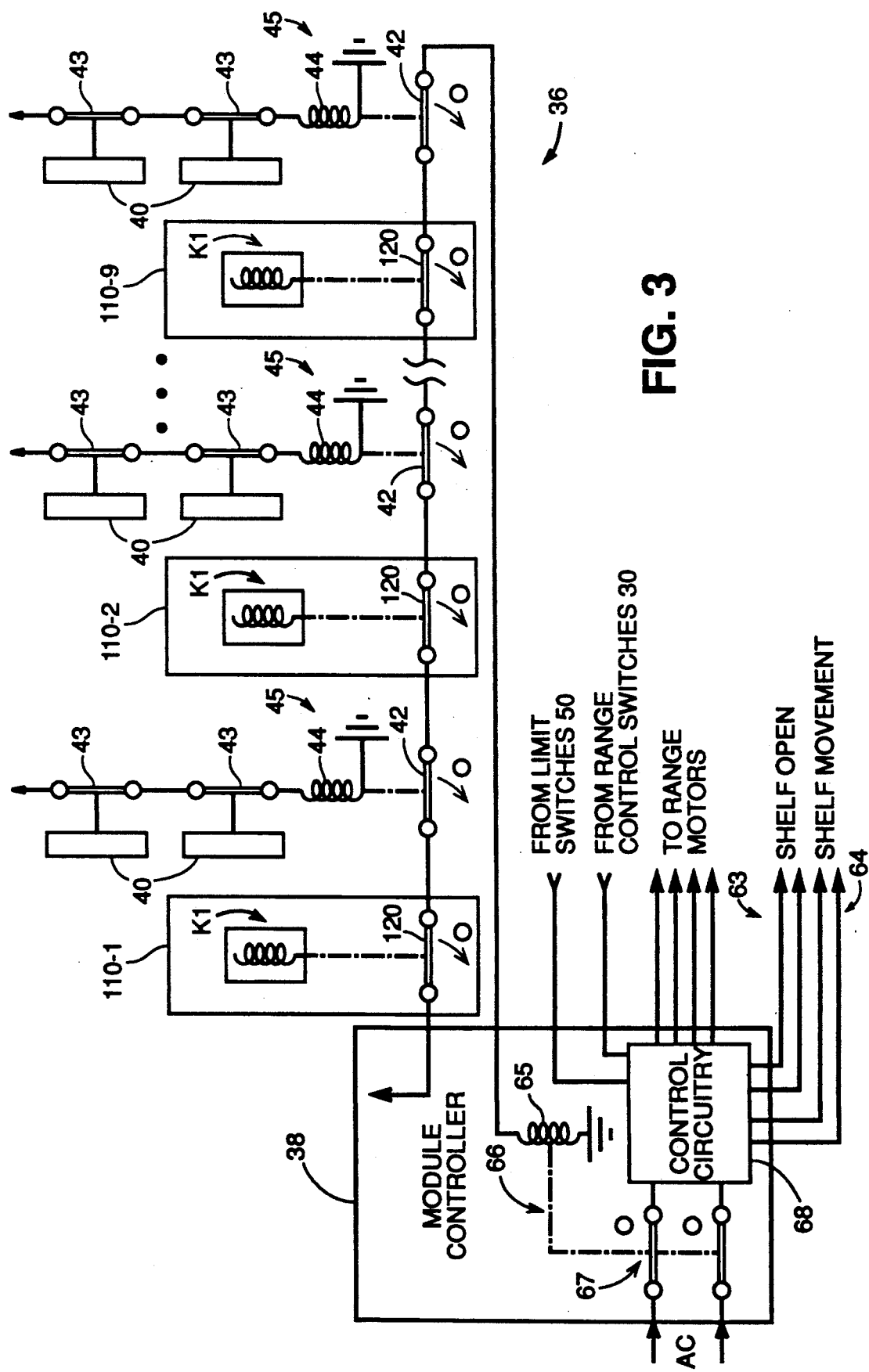
FIG. 3 is a simplified and illustrative schematic diagram of the safety bar switch and personnel detector control loop of the module control system of FIG. 2.

As depicted in FIG. 3, each safety bar 40 is coupled to a respective switch 43. For each range, the switches 43 for the safety bars of that range are connected in series with a source of power and the coil 44 of a relay 45. A coil 44 for a range controls a switch 42 for that same range. Depression of a safety bar 40 opens the associated switch 43, which cuts off power to the associated relay coil 44 which causes the associated switch 42 to open. Any open switch 42 cuts off power to relay coil 65, which opens the associated switch 67, as described above.

FIG. 3 is a simplified schematic diagram and is meant to be illustrative. Therefore, connection of other control devices such as limit switches 50 and the control circuitry for supplying power to the range motors for bi-directional movement are not shown. However, details relating to connection of such other devices and to the control circuitry are known to those of skill in the art.

Each monitor 110, as discussed above, is capable of detecting the presence of a person within its field of detection, which is effectively the entire space of an open aisle in which a person is expected to be, from any slight movement of the person such as breathing or body-weight shifting. In the preferred embodiment, monitor 110 is a field disturbance monitor which transmits microwave radar pulses and monitors the change in the reflected signals to determine a field disturbance indicative of movement. Thus, the presently preferred monitor 110 is a radar system, preferably an X-band radar transceiver, which is described in detail below and in related application Ser. No. 703,178.

Figure 4A:
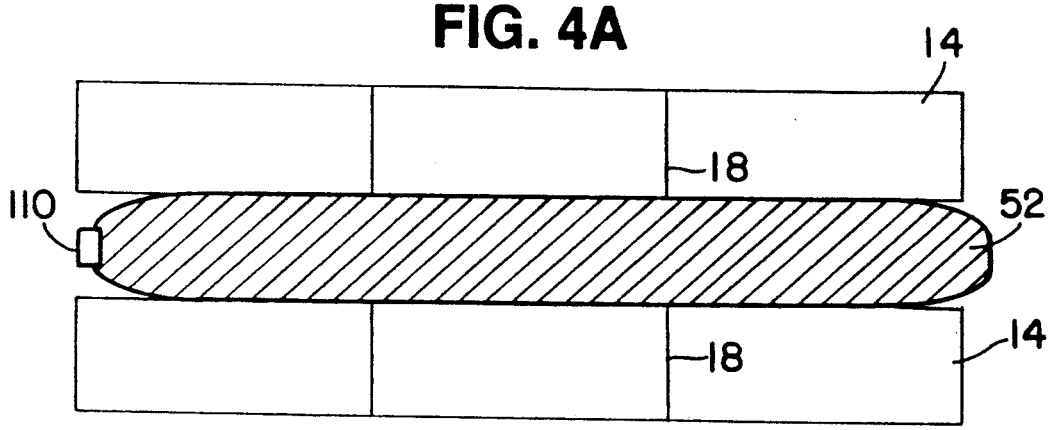
FIGS. 4A and 4B are top and side views, respectively, of an open aisle in the mobile storage system of FIG. 1, depicting the radiation or field pattern transmitted within the open aisle in accordance with the invention by a microwave radar transmitter of a preferred embodiment of a personnel detector according to the invention.
Figure 4B:
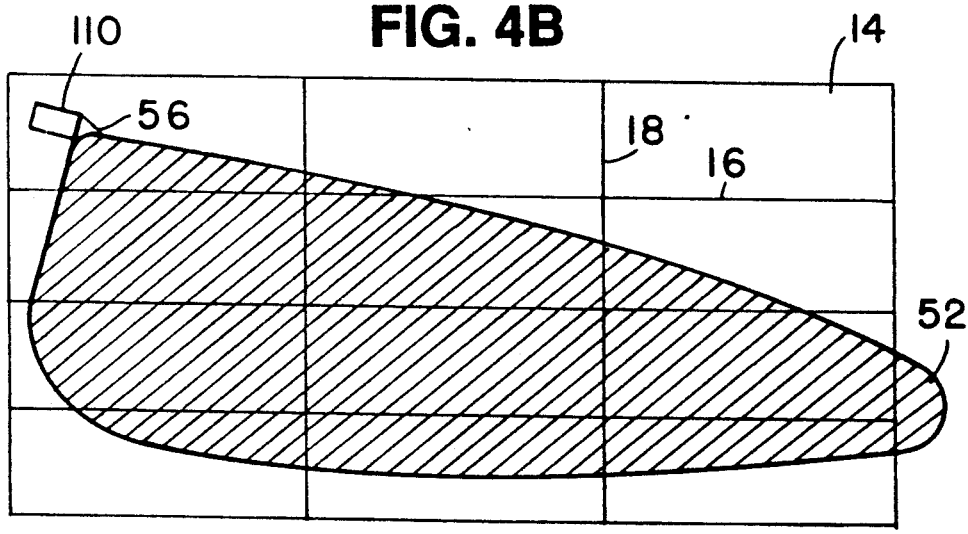

Referring to FIGS. 4A and 4B, a typical radiation pattern 52 obtained from the transmitter (128, FIG. 8) of monitor 110 using a simple wave guide horn dipole antenna (not shown) with a metal deflector 56 (FIG. 5) positioned over the antenna is represented within the hatched area between ranges 14.

Figure 4C:
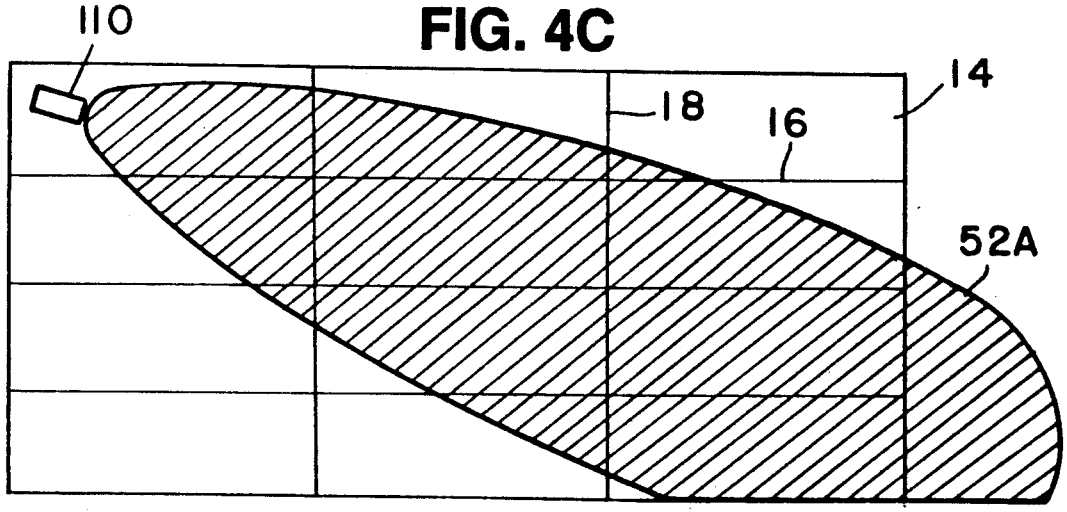
FIG. 4C is a side view of an open aisle similar to the view of FIG. 2 but showing the radiation field pattern from the microwave radar transmitter without the radiation deflector of FIG. 5.
Figure 5:
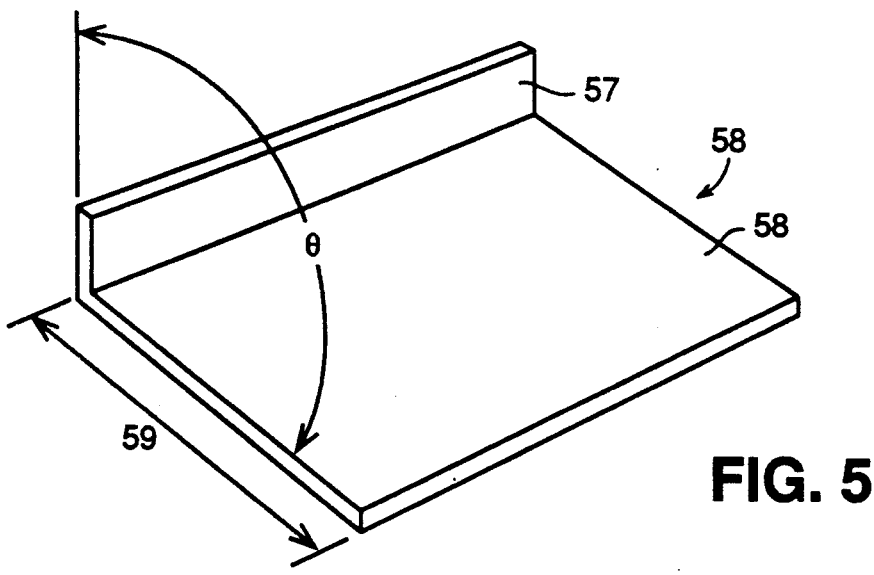
FIG. 5 is a perspective view of a radiation deflector attached to the microwave radar transmitter of the personnel detector according to the invention.

Referring to FIG. 5, reflector 56 comprises a mounting flange 57 for mounting on the monitor chassis, and an angled conductive radiation deflector portion 58 having a length 59 of preferably about 2 inches which is positioned about an inch over the conventional horn antenna at an angle $\theta$ of preferably about 180° but other angles and lengths of the deflector can be chosen for other aisle dimensions. The antenna was mounted to the monitor above the aisle set into the aisle about three feet from the aisle end. The radiation pattern 52 as represented in FIGS. 4A and 4B fills virtually the entire aisle, which ensures that a person essentially anywhere within the aisle, except perhaps at the aisle ends, will modify the signal reflected back to the monitor 110. A person present at the end of an open aisle is not of great concern because the person can simply step out of the aisle if a range 14 moves. FIG. 4C shows within the hatched area the pattern 52A that would have resulted if no deflector 56 were used, whereas FIG. 4B depicts the pattern 52 obtained with the deflector 56. Deflector 56 directs more of the energy downward to ensure that a person standing beneath the monitor 110 will be detected.

As represented in FIG. 4A, the radiation pattern is substantially confined between the metal shelving which acts as a waveguide. Less scattered radiation results in more efficient use of the generated radiation which reduces power requirements. Essentially all of the generated radiation is used due to this waveguide effect of the shelving.

An X-band frequency is preferred for the transmitted radar signal in view of the typical aisle dimensions. An example of one such frequency is 10.525 GHz. A receiver part of the microwave radar system of monitor 110 measures the energy reflected back from all objects in the radiated field of the system. As indicated below, the resulting signal remains constant as long as there is no movement in the field of detection. A moving object within the field of detection causes both an amplitude change as well as a phase shift in the reflected signal, and these changes in the reflected signal cause wide signal excursions in the receiver part of the microwave radar system as the reflected signal goes in and out of phase with reflections from other fixed objects.

FIG. 6 is a state table for a preferred embodiment of the module control system 36. The required sequence of operations can be achieved in various ways. Hand-wired circuitry can be used, such as known logic circuits to detect various system states and determine how to establish new system states. Alternatively, the desired sequence of operations can be obtained by suitable programming of a microprocessor, microcomputer or microcontroller to assume the different states described upon the relevant events occurring. A suitable sequence is described below, and a suitable program implementing the sequence may be obtained by one skilled in the art with known components using the detailed information supplied below and in the state diagram of FIG. 6.

Figure 7A:
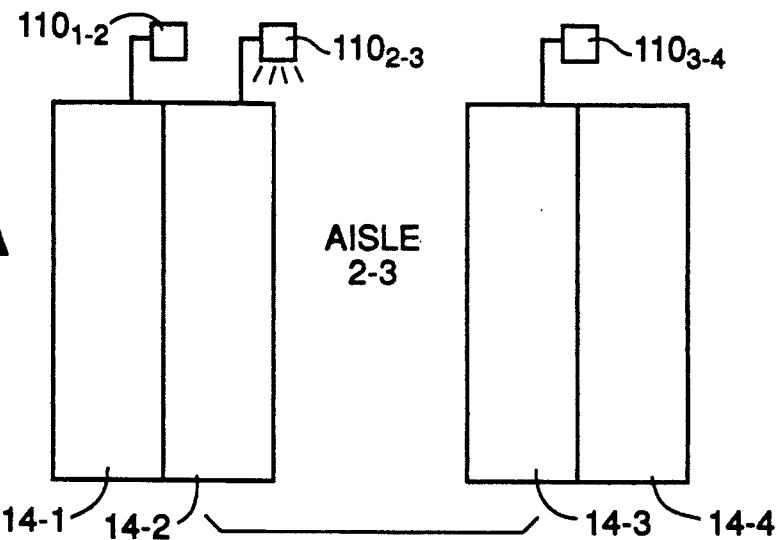
FIGS. 7A, 7B and 7C are end schematic views of a module of a mobile storage system similar to that of FIG. 1 illustrating opening and closing of aisles.
Figure 7B:
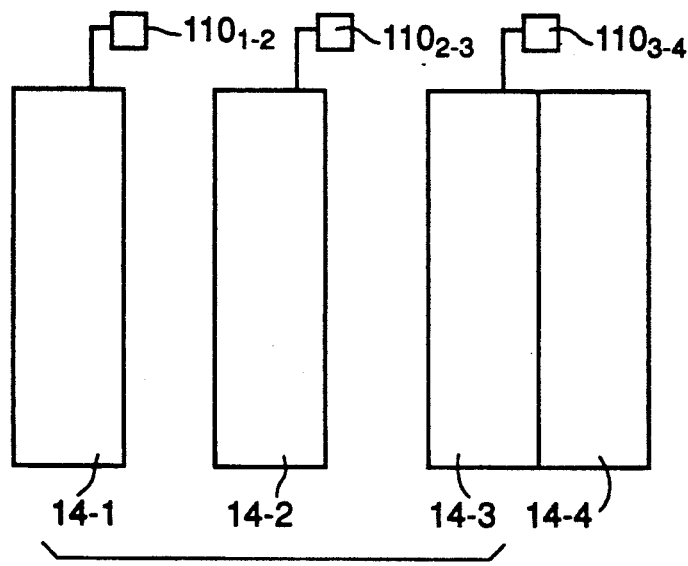
Figure 7C:
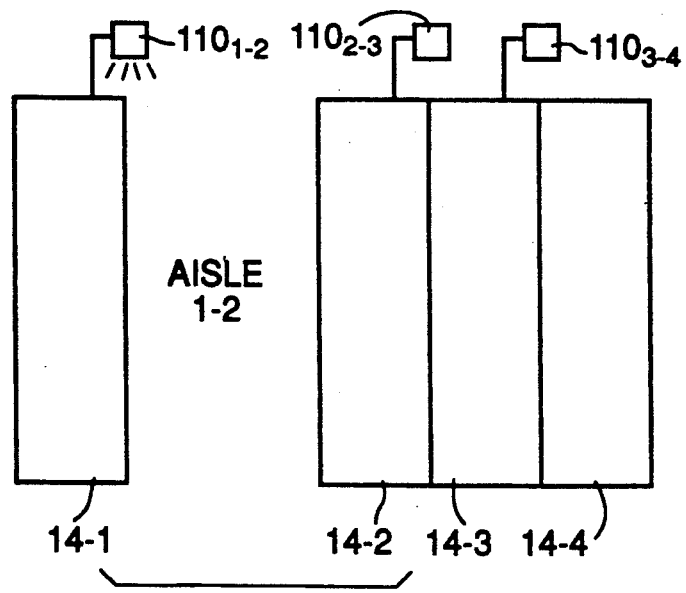

In FIG. 6 various states of a mobile storage module 10A shown in FIGS. 7A-7C with four ranges 14-1, 14-2, 14-3 and 14-4 are described in the leftmost column.

The column headed "Aisle 1-2" represents the actual or prospective aisle between ranges 14-1 and 14-2, "Aisle 2-3", the actual or prospective aisle between ranges 14-2 and 14-3, and so on. The column headed "Monitor 1-2" represents the monitor which is mounted over aisle 1-2 when open to detect the presence of a person within that aisle, "Monitor 2-3" represents the monitor $110_{2-3}$ over aisle 2-3, and so on. These columns indicate whether a particular monitor is enabled (ON) or disabled (OFF), which are determined by module controller 38 from the status of relevant limit switches 50, as indicated by the signals on shelf open and shelf movement lines 63 and 64.

In FIG. 6, "C" is an abbreviation for closed, and "O" is an abbreviation for open, meaning that a particular aisle is either closed and inaccessible or open and accessible. FIG. 6 also includes a column headed "Range Control Switch", which corresponds to the range control switch 30 on the end panel of each range 14, and can have two states: "I" meaning inactive and "A" meaning that it has been activated. The column headed "Motor" represents whether the motors for the ranges adjacent the open aisle are in a disabled or enabled condition. The column headed "Remarks" references the appropriate FIG. 7A, B or C illustration representing the state of the mobile storage system 10A.

The starting state for describing the operation of the detector 110 system is STATE_0, which is arbitrarily selected to be the state depicted in FIG. 7A which shows aisle 2-3 open. In this state only monitor $110_{2-3}$ above open aisle 2-3 is enabled (ON). The other monitors $110_{1-2}$ and $110_{2-3}$ are disabled (OFF) via appropriate signals on lines 63 and 64 from module controller 38 (FIG. 2). Moreover, the motors for all the ranges are disabled, because no range control switch 30 has been activated. To enable a motor, two conditions must be satisfied. First, range control switch 30 must have been activated indicating that one or more ranges 14 must be moved to open the aisle; and second the enabled monitor 110 in the open aisle must not have detected movement in the open aisle within a predetermined period of time.

Figure 8:
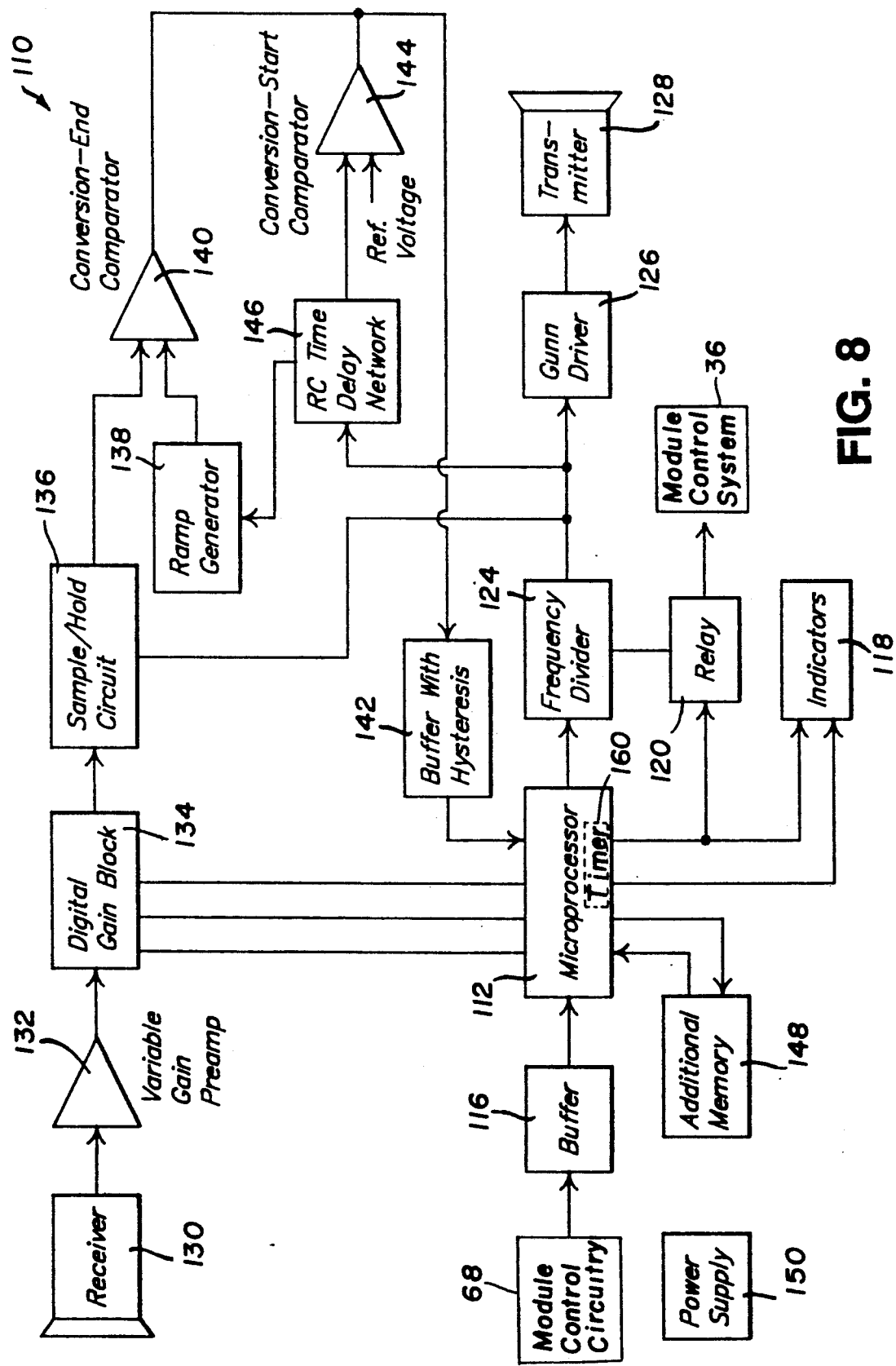
FIG. 8 is a block diagram of the personnel detector or field disturbance monitor system of the preferred embodiment of the invention.

One of the features of the invention is that every time that an enabled monitor 110 detects the presence of a person in an open aisle it resets a timer, which is implemented in software as illustrated by a timer 160 shown in FIG. 8 as a part of the microprocessor 112 of a respective monitor 110. The software timer is a delay loop in the control program of the microprocessor. The microprocessor 112 of a respective monitor 110 is connected to the respective relay K1 in loop 62 as described above. A motor for a range adjacent an open aisle is not enabled by module control system 36 until the timer 160 of the enabled monitor 110 times out to allow the corresponding relay K1 to change the state of the related switch 120.

In the STATE_0 condition illustrated in the first row of FIG. 6, only the safety bar switches $30_{2-3}$ and monitor $110_{2-3}$ adjacent the open aisle 2-3 are enabled and the other safety bar switches and monitors are disabled.

In the STATE_1 condition illustrated in the second row of FIG. 6, a person (person_1) enters the open aisle 2-3. The only change that occurs from the STATE_0 condition is that the monitor $110_{2-3}$ over aisle 2-3 detects the movement of person_1 entering aisle 2-3. As long as the person_1 is present in the aisle, monitor $110_{2-3}$ detects the presence of that person and will reset the timer 160 with the result that the timer never times out and the corresponding relay K1 does not close its associated switch 120. Therefore, module control system 36 prevents the motor for the ranges 14-2 and 14-3 adjacent the open aisle 2-3 from being enabled.

In the STATE_2 condition illustrated by the third row in FIG. 6, a second person, person_2, activates a range control switch $30_{1-2}$ on the end of range 14-1 to open aisle 1-2. For aisle 1-2 to open, range 14-2 must be moved to the right. While one condition for enabling the motor for range 14-2 has been satisfied because of activation of the range switch, the second necessary condition, which is no detection of motion in the open aisle, has not yet been satisfied. As a result, the motor for range 14-2 remains in its disabled state.

The STATE_3 condition is the same as the STATE_2 condition except that person_1 has just exited the aisle 2-3 but timer 160 has not yet timed out. Thus, monitor $110_{2-3}$ no longer detects a person in aisle 2-3, which would otherwise allow the appropriate motor to be enabled, but timer 160 has not yet timed out so that the conditions in STATE_3 are essentially no different from those in STATE_2.

In STATE_4, timer 160 has timed out and both conditions are now satisfied, i.e., activation of a range control switch 30 and no detection of person in the open aisle 2-3 for a predetermined time (timer 160 time-out). In STATE_4, the motor for range 14-2 is enabled and becomes active and starts to move the range 14-2 to the right toward the range 14-3 (FIG. 6B). As mentioned above, limit switches 50 (FIGS. 1 and 2) are activated whenever a range reaches the end of a possible range of movement or leaves a position which is at the end of a possible range of movement. Therefore, when range 14-2 moves away from range 14-1, a limit switch 50 is activated which causes module control system 36 to switch OFF monitor $110_{2-3}$ (shelf movement line 64 from module controller 38 in FIG. 2). Monitor $110_{2-3}$ is switched OFF to prevent it from sensing the movement of the closing range which could interfere with the operation of module 12A or 12.

During opening of an aisle, the state of monitor $110_{1-2}$ located over the opening aisle 1-2 is unimportant. The monitor over the opening aisle can be enabled during aisle opening, and microprocessor 112 programmed to ignore any inputs from that monitor during this transition period. Alternatively, as illustrated by STATE_5 in FIG. 6, monitor $110_{1-2}$ over aisle 1-2 can remain OFF (shelf open line 63 from module controller 38 in FIG. 2) until a limit switch 50 is activated by range 14-2 when it reaches the end of its range (FIG. 7C), and at that point module control system 36 can switch monitor $110_{1-2}$ ON over the open aisle. In STATE_5, monitor $110_{1-2}$ over aisle 1-2 is ON, the other monitors are OFF, and the motors for ranges 14-1 and 14-2 are disabled because neither of the enable conditions are satisfied.

The time delay implemented by timer 160 of microprocessor 112 can be chosen from a broad range of values in accordance with the particular application of the storage system 10. Typically, the timer 160 will be set to time out in 3-10 seconds, which is a reasonable time for a typical storage system installation. For installations which involve frequent and active accessing of things held in the system, the delay can be reduced to several seconds or even less. For systems with long aisle lengths or in which items are accessed infrequently, the timer can be set for a longer time.

While it is preferred that the presence or motion detector used in the invention is a microwave transceiver radiating in the X-band, other radiation wavelengths that can establish a field pattern in the aisle that when modified by a person can be detected can be substituted. Other devices such as TV cameras, infrared detectors, sonic detectors, etc., can also be used as monitors and incorporated into a system to detect movement within a field of detection.

Also, while the system has been described as enabling and disabling the motors in response to detection of the presence of a person in a open aisle, the same system can easily provide indicators, such as suitable lights, on a panel activated by the same monitor to warn a person not to move a range while another person is within an open aisle. These indicators can be used in addition to or in place of enabling and disabling the motors.

There are many systems to move carriages of a mobile storage system, whether via electric motors or mechanical arrangements, and it is not intended that the invention not operate with such systems as long as a switch such as switch 120 may be coupled to operate with such systems. The patents and patent applications referred to above disclose mechanical systems and systems including electrical motors. Other examples of systems including electrical motors are disclosed in U.S. Pat. Nos. 4,745,516 (Griffin), 4,733,923 (Dahnert), 4,437,711 (Dahnert), 4,422,816 (Naito et al., commonly assigned), 4,412,772 (Naito et al., commonly assigned), 4,307,922 (Rhodes, Jr.) and 3,957,322 et al.), the disclosures of all of which are incorporated herein by reference.

The following description of monitor 110 is similar to that in related application Ser. No. 703,178.

FIG. 8 illustrates a block diagram of the field disturbance monitor system 110 of the present invention. At the heart of the system is the microprocessor 112 which controls the various parts of the system and determines whether there is a moving object within an area being monitored, such as an aisle. The microprocessor 112 receives operator induced control signals from module control circuitry 68 of module control system 36 through a buffer 116. The microprocessor 112 controls indicators 118 which tell the operator whether there is motion in the aisle or whether motion has stopped for a predetermined period of time. The microprocessor 112 controls a relay K1 (including switch 120) which is coupled to module control system 36 to control movement of the shelves or ranges 14. The microprocessor 112 also employs a crystal to generate a clock signal which besides timing the operations within the microprocessor 112 is processed by a frequency divider 124 to provide timing and synchronization of other components of the system. The microprocessor 112 furthermore controls the digital gain applied to the detected return signal. In addition, the microprocessor 112 utilizes memory resident software to perform programmed calculations used for conversion and comparative purposes described hereinafter. Thus, it should be appreciated that the microprocessor 112 interfaces with various circuit elements to control the active field disturbance monitor system 110 according to the present invention.

The frequency divider 124 divides the clock signal from microprocessor 112 down to approximately 1000 hertz. While a frequency on the order of 1000 hertz is preferred, it should be appreciated that other frequencies may be utilized if suitable circuit components are utilized having suitable frequency response to the new frequency. This divided clock signal is utilized for all system timing. Thus, for example, this divided clock signal is supplied to a Gunn driver circuit 126 to provide a pulse-modulated microwave signal as discussed below.

The Gunn driver 126 supplies the transmitter 128 (whose active component is a solid-state X-band Gunn diode oscillator) with a square wave signal (approximately 1000 hertz). The resulting microwave output signal is emitted from an antenna or wave guide horn radiator of the transmitter 128 with a gain of about 16 dB, which radiates the signal over the field or area where movement is to be detected. The transmitted signal is a pulse-modulated microwave signal having a center frequency of 10.525 gigahertz. This results in a pulse-modulated reflection which is easier to process than a continuous wave signal.

The reflected signal is received by a microwave receiver 130 which includes an antenna having a gain of about 16 dB and a microwave detector diode in a cavity which is tuned to accept the frequency of the transmitted signal. The detected signal is then amplified by a variable gain pre-amp 132, which includes filters to restrict amplification to the desired frequency range. The magnitude of the amplified detected signal is then amplified by the digital gain block 134 which provides binary gains of 1, 2, 4, 8, 16, 32, 64 and 128 as controlled by the microprocessor 112.

The detected and amplified return signal is then processed by a sample and hold circuit 136 which momentarily stores the voltage amplitude of the detected signal. This circuit is controlled by the clock signal from the frequency divider 124. The sample and hold circuit 136 samples the signal during transmitter high pulses and holds the voltage magnitude during transmitter low pulses.

A conversion-start comparator 144 compares an input voltage from an RC time delay network 146 with a reference voltage to start conversion a short time after frequency divider 124 goes low. The conversion-start comparator 144 signals the microprocessor 112 through the buffer 142 to initiate a timer internal to the microprocessor 112 that begins counting clock cycles after the RC time delay network 146 discharges below the reference voltage during transmitting low cycles. This begins an analog to digital conversion process.

A ramp generator 138 is also controlled by the RC time delay network 146 and provides a linearly increasing ramped voltage between transmitter pulses. A conversion-end comparator 140 compares the voltage amplitude of the detected signal from the sample and hold circuit 136 with the increasing reference voltage from the ramp generator 138. When the ramp voltage reaches the amplitude of the detected signal, the conversion-end comparator 140 sends an output signal through a buffer 142 to the microprocessor 112 to stop the timer. If the ramp voltage does not reach the amplitude of the sample during the transmitter off time the conversion-start comparator 144 terminates the conversion when frequency divider 124 goes high. The RC time delay network 146 is over-ridden by a diode on the positive transition. At this stage, the conversion process is completed and the number of clock pulses counted is a representation of the magnitude of the detected return signal. The microprocessor 112 then determines whether the measured time period is in the middle portion of the transmitter off period. If the measured time period is above a preset upper limit, the microprocessor 112 signals the digital gain control circuit 134 to decrease its gain by a factor of two. This continues on successive samples until the signal falls below the upper limit. Likewise, if the measured time period is below a preset lower limit, the gain is increased until the amplitude is in the proper range. The resulting time period is multiplied by the inverse of the gain to represent the magnitude of the sampled signal. The microprocessor 112 then processes a succession of such samples to detect variations which would indicate a person or target in the monitored area.

Additional memory 148 is available to facilitate added capacity for other applications of the monitor system 110. For example, the monitor system 110, can be used to stop an automatic door from opening if a person is in its path. This application requires the monitor system 110 to distinguish between movement of the door, which is authorized when no one is in its path, and movement of a person. Using the additional memory 148 and position encoders, the monitor system 110 can be programmed to learn and ignore ordinary movement of the door.

The power supply 150 provides various voltage levels to the sensor circuits for biasing and other power purposes.

Figure 9A:
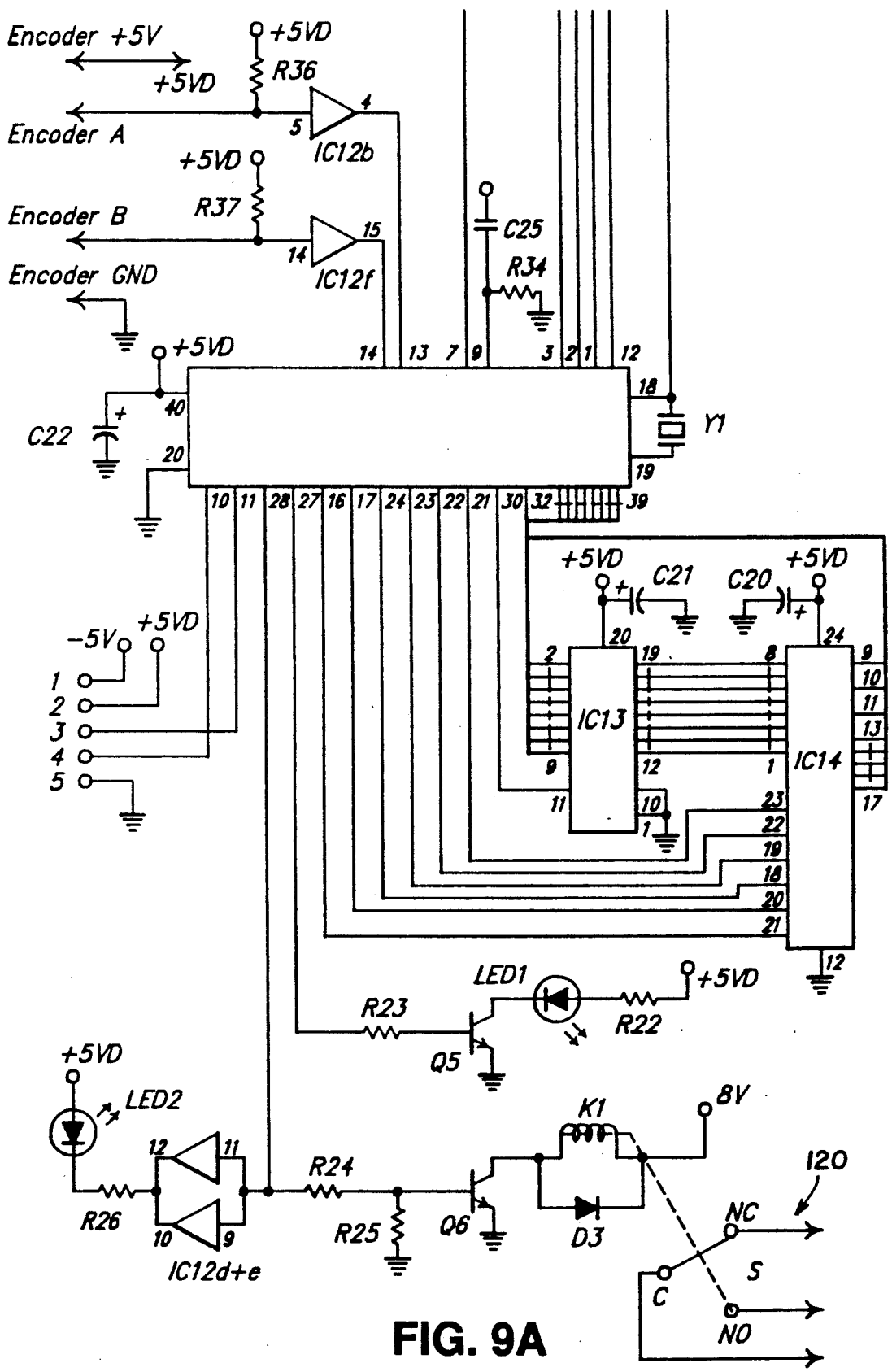
FIGS. 9A, 9B and 9C are a schematic diagram of the personnel detector of the preferred embodiment of the invention.

Turning now to FIG. 9A, the microprocessor 112 shown is manufactured by Signetics and is a type 87C51. Although this type of microprocessor is preferred, other suitable microprocessors may be used in the appropriate application. This particular microprocessor model comes equipped with an internal 64×8 RAM memory and an internal 2K×8 ROM memory. Crystal Y1, having a frequency of 7.3728 megahertz, is coupled between pins 18 and 19. Pins 16, 17, 21-24, 30 and 32-39 are coupled to the additional memory 148, which includes memory chip IC14 and address latch IC13. Address latch IC13 is controlled by the address latch enable output at pin 30 of the microprocessor 112. The memory chip IC14 is preferably a 2K×8 RAM chip, but it should be appreciated that other suitable types of memory circuits could be employed in the appropriate application. Pins 10 and 11 are coupled to a diagnosis port for testing. Pin 20 is connected to ground. Pin 40 is connected to a 5 volt DC source which is stabilized by capacitor C22. Pins 13 and 14 of microprocessor 112 receive data from door position encoders which are used in conjunction with the additional memory 148 for other applications of the system such as the above-mentioned automatic door application used. Pin 7 is coupled to the buffer IC12a, through which shelf control commands are processed. Pin 9 is coupled to a reset circuit powered by 5 volt DC power and including capacitor C25 and resistor R34.

Data bus pins 32-39 of microprocessor 112 are coupled to pins 2-9 and 11 of address latch IC13 and pins 9-11 and 13-17 of memory chip IC14. Address and control pins 16, 17 and 21-24 of the microprocessor 112 are coupled to pins 18-23 of memory chip IC14. Address latch IC13 and memory chip IC14 are coupled to each other through pins 12-19 of address latch IC13 and pins 1-8 of memory chip IC14. Pin 20 of address latch IC13 and pin 24 of memory chip IC14 are coupled to 5 volt DC power which is stabilized by capacitors C20 and C21.

Relay K1 is coupled to pin 28 of microprocessor 112 through a drive circuit employing transistor Q6 and bias resistors R24 and R25. The relay K1 includes switch 120 which is connected to the module control system 36 (see FIGS. 2 and 3). Switch 120 is closed when a command signal from pin 28 of microprocessor 112 energizes relay K1 by turning on transistor Q6. The closure of switch 120 permits module control system 36 to enable the respective range motor to move a range so as to close an aisle. Thus, the relay K1 and its associated switch 120 provide a failsafe feature in that the switch 120 opens when power to the sensor is lost.

There are two indicator circuits controlled by microprocessor 112 through signals transmitted from pins 27 and 28. One indicator circuit receives a signal from pin 27 of the microprocessor 112 and employs resistor R23, transistor Q5, LED1, resistor R22, and 5 volts power. This indicator circuit energizes the green LED1 when transistor Q5 conducts to visibly show that movement is currently detected. LED1 is de-energized when movement is no longer detected. The other indicator circuit receives a signal from pin 28 of the microprocessor 112 and employs buffers IC12d and e, LED2, resistor R26 and 5 volts DC power. This second indicator circuit energizes the red LED2 to visibly show that movement has been detected in the last three seconds and that the shelf is not cleared to move. In essence, LED1 and LED2 are both energized when movement is detected. The difference between the two is that LED2 will remain energized until no movement has been detected for three seconds, while LED1 is de-energized immediately when no movement is detected.

Figure 9B:
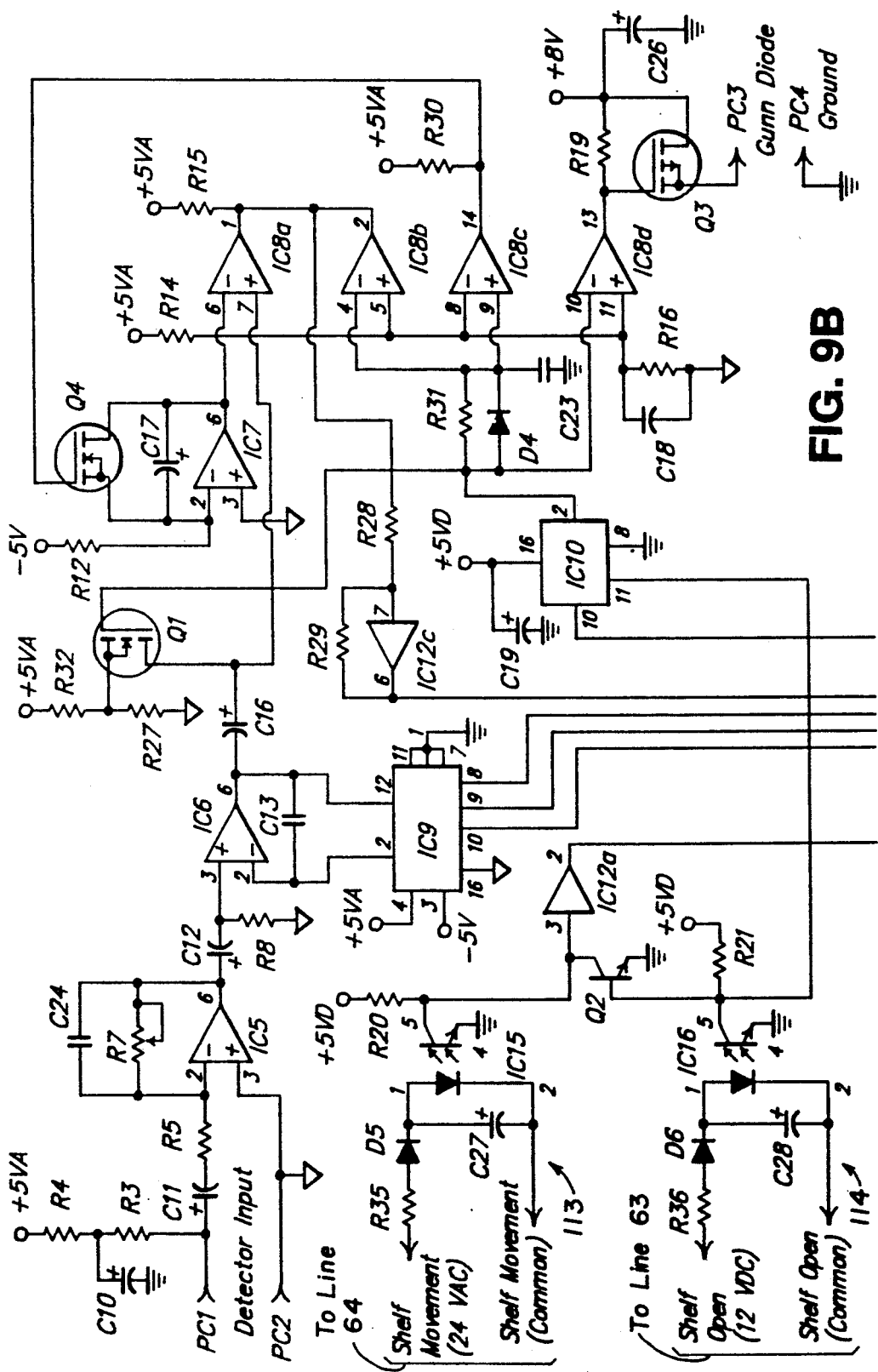

Turning now to FIG. 9B, the signal at pin 18 of microprocessor 112 is coupled to pin 10 of frequency divider 124 which divides the 7.3728 megahertz clock signal by 8,192 to achieve a square wave signal at pin 2 having a period of 1.111 milliseconds (i.e., a frequency of approximately 1,000 hertz) and a duty cycle of 50 percent. Pin 11 of the frequency divider circuit 124 is coupled to the shelf control circuitry 114 which deactivates the frequency divider when there is no aisle present within the detection area and when an aisle is to be created. The output signal at pin 2 of the frequency divider 124 is utilized for all system timing.

The frequency divider 124 is coupled to the Gunn driver 126 at pin 10 of comparator IC8d. Pin 11 of comparator IC8d is connected to a reference voltage derived from a 5 V power supply through a voltage divider network employing resistors R14 and R16. The voltage at pin 11 of the comparator IC8d provides a reference signal whose level depends upon the values of resistors R14 and R16. The output at pin 13 of comparator IC8d is coupled to the gate of transistor Q3 which is a p-channel field effect transistor (BUZ171). The source is coupled to an 8 volt bias source, which is stabilized by capacitor C26. The biasing circuit includes resistor R19 between the source and the gate of transistor Q3. The drain terminal of transistor Q3 is coupled to the Gunn diode of the Gunn diode oscillator within the transmitter 128.

The transmitter 128 is manufactured by Alpha Industries and has a model number GOS2572. It includes a Gunn diode oscillator and an antenna with a gain of approximately 16 dB for emitting the microwave signal. Other suitable transmitters and antennas may be used in the application.

The receiver 130 employs standard commercially available parts including a standard horn antenna and a detector diode mounted in a tuned cavity. The receiver 130 utilized in this system employs a detector diode mounted in the X-Band cavity. The detector diode is manufactured by Alpha Industries and has a model number DDC4563A. Other suitable receivers may be used in the application. The antenna, with approximately 16 dB gain, channels the return signal to the detector diode. The return signal travels from the detector diode terminals PC1–PC2 through a coupling network into amplifier IC5. Biasing is provided by resistors R4 and R3 and the 5 volt source. Capacitor C10 provides filtering. An RC network consisting or R5 and C11 provides further filtering of the return signal.

Variable gain pre-amp 132 employs amplifier IC5, potentiometer resistor R7 and capacitor C24. Gain is controlled and can be preset by varying the value of resistor R7.

Variable gain pre-amp 132 is coupled to pin 3 of the digital gain block 134 through a filter network employing resistor R8 and capacitor C12. The digital gain block 134 employs non-inverting amplifier IC6, capacitor C13, and a digitally programmable feedback element called a binary gain set circuit IC9. Digital gain set circuit IC9 provides binary scale gains of 1, 2, 4, 8, 16, 32, 64 and 128 as controlled by the microprocessor 112. Capacitor C13 is coupled between pins 2 and 6 of the digital gain set circuit IC9. Pins 2 and 12 of digital gain set IC9 are coupled between pins 2 and 6 of amplifier circuit IC6. Pins 8-10 of the digital gain set IC9 are coupled to pins 1-3 of microprocessor 112. In this regard, the microprocessor 112 transmits command signals to the digital gain set circuit IC9 to control selectable internal resistance between pins 2 and 12 of digital gain set circuit IC9 in binary increments.

The digital gain block 134 is coupled to the sample and hold circuit 136 through capacitor C16. Sample and hold circuit 136 includes transistor Q1, which is an n-channel field effect transistor (2N7000). Resistors R32 and R27 provide a bias voltage for the source terminal of transistor Q1. The gate terminal on transistor Q1 is coupled to the clock signal output at pin 2 of frequency divider IC10. The drain terminal of transistor Q1 is coupled to the positive terminal of capacitor C16. When the clock signal from frequency divider 124 is high (causing the transmitter 128 to emit a pulse of microwave energy), Q1 causes the positive terminal of capacitor C16 to be held to a slightly positive voltage while the negative terminal is charged to a negative voltage by amplifier IC6. When the clock signal goes low (causing the transmitter 128 to turn off), Q1 disconnects and allows the positive terminal to float. During the transmitter off period IC6 returns to a no-signal level and drives the negative terminal of capacitor C16 to near ground (0 volts). Since the positive terminal of capacitor C16 has been disconnected from the voltage divider it can now rise as much as amplifier circuit IC6 rises when returning to its no-signal level. The positive terminal now holds a voltage approximately equal to the signal excursion. Thus, it should be appreciated that the capacitor C16 samples and then retains the magnitude of the return signal (after digital gain block 134) when the transmitter has been turned off.

Pin 4 of the conversion-start comparator IC8b is coupled to pin 2 of frequency divider IC10 through an RC time delay network 146 employing resistor R31 and capacitor C23. Pin 5 is coupled to a fixed voltage reference from resistor network R14 and R16. Pin 2 of conversion-start comparator IC8b employs the same feedback path to pin 12 of microprocessor 112 as the conversion-end comparator IC8a. This common feedback path is comprised of resistors R29 and buffer IC12c. The resistors R28 and R29 provide hysteresis to buffer IC12c to steepen the rise and fall presented to the microprocessor 112. Conversion begins when the RC time delay network 146 discharges such that the voltage at pin 4 of conversion-start comparator IC8b falls below the voltage reference at pin 5.

Ramp generator 138 employs amplifier IC7, capacitor C17, transister Q4, comparator IC8c and resistors R30 and R12. Pin 9 of comparator IC8c is coupled to pin 2 of frequency divider IC10 through diode D4. Pin 8 of comparator IC8c receives a constant voltage reference from the resistor network made up of resistors R14 and R16. The output of comparator IC8c at pin 14 is pulled up to the 5 volt supply by resistor R30 when pin 9 is higher than pin 8. The comparators of IC8 have open collector outputs and therefore need a pull up resistor. Pin 14 of comparator IC8c is coupled to the gate of transistor Q4 which is an n-channel field effect transistor (2N7000). Capacitor C17 is coupled between the source and the drain of transistor Q4, and pin 2 of amplifier IC7 is coupled to the source of transistor Q4 and to −5 volt power through resistor R12. Pin 6 of amplifier IC7 is coupled to the drain of transistor Q4. Pin 3 of amplifier IC7 is coupled to ground.

The output signals of the ramp generator 138 and the sample and hold circuit 136 are coupled to pins 6 and 7 of the conversion-end comparator IC8a respectively. The output of comparator IC8a is fed back to the microprocessor 112 through buffer 142 with hysteresis which includes resistors R28 and R29 and buffer IC12c. The output at pin 6 of buffer 142 provides a signal to microprocessor 112 for operating a timer internal to the microprocessor 112.

Monitor 110 includes a "shelf movement" circuit 113 and a "shelf open" circuit 114 (FIG. 9B) for monitoring the status of the ranges. The shelf open circuit 113 receives a shelf open signal on line 63 and notifies the microprocessor 112 that the range is open, and the shelf movement circuit receives a shelf movement signal on line 64 and notifies the microprocessor 112 that a range is moving. The shelf movement circuitry 114 is coupled to pin 7 of microprocessor 112 and employs resistors R35 and R20, diode D5, capacitor C27, opto-isolator IC15, and buffer IC12a.

The shelf open circuit 113 is coupled to pin 11 of frequency divider IC10 to deactivate frequency divider IC10 when the aisle is closed. The shelf open circuit employs resistors R20, R21 and R36, diode D6, capacitor C28, transistor Q2 and opto-isolator IC16.

In operation, the waveform from crystal Y1 is divided by the frequency divider IC10 into an approximately 1,000 hertz square wave. The output at pin 2 of the frequency divider IC10 provides a clock signal input to comparator IC8d, which drives transistor Q3. The output from transistor Q3 controls transmitter 128, so as to provide pulsed microwave energy from the transmitter antenna to a detection zone.

The reflected signal is received by the antenna of receiver 130 which channels the signal to its microwave detector diode. The microwave detector diode superimposes the detected signal, thereby summing the phase-shifted signals, resulting in a single-pulse superposition signal. The detected signal is then filtered, and amplified by the variable gain pre-amp 132. Next, the signal is amplified by the digital gain circuit 134 as controlled by the microprocessor 112. The signal output at pin 6 of IC6 is an amplified version of the detected return signal. In this regard, the resulting signal somewhat resembles the square wave.

During transmitter on-time the transistor Q1 is clocked "on" concomitantly with transistor Q3. When transistor Q1 conducts, the positive terminal of capacitor C16 is clamped to a voltage slightly above ground. This voltage is determined by the 5 volt power supply and the voltage dividing resistors R32 and R27. This allows the negative terminal of capacitor C16 to be charged with a voltage signal equal to the magnitude of the processed return signal output of digital gain set circuit IC6.

Transistor Q4 is also turned "on" through diode D4 and comparator IC8c. As a result, capacitor C17 remains discharged. When the transmitter is off (between high clocking pulses), transistor Q1 is immediately turned off. This will cause the voltage level on the positive terminal of capacitor C16 to go positive as far as pin 6 of amplifier IC6 went negative when the transmitter was on, thereby sampling and holding the signal. At the same time, transistor Q4 continues to hold briefly until resistor R31 discharges capacitor C23 below the voltage reference set by resistors R14 and R16. At this time comparator IC8c switches and turns off transistor Q4 which allows the ramp generator 138 to function. A constant current as set by resistor R12 is applied to capacitor C17 by amplifier IC7. This causes the voltage on capacitor C17 to ramp positive linearly.

Simultaneously, the comparator IC8b switches and signals the microprocessor 112 via buffer 142 to initiate a counter within the microprocessor 112. This begins a conversion process. During conversion, the comparator IC8a compares the processed magnitude of the reflected signal with the linear ramp voltage. The microprocessor 112 counts the time required for the ramp voltage to rise to the amplitude of the reflected signal. When the ramp voltage reaches the signal voltage level on capacitor C16, comparator IC8a switches and signals the microprocessor 112 via amplifier IC12c to stop counting, thereby ending the conversion process. The time measured is a representation of the value of the reflected signal. At this point, the analog voltage signal has been converted to digital count.

Since the transmitter 112 is pulsed repetitively at a preset frequency the microprocessor 112 receives a continuous succession of samples. The microprocessor 112 subjects these samples to two recursive averaging processes. The first averaging process is a short term average that is used to filter out random noise in the system. The second averaging process is a longer term average that is used to establish a reference. If the short term average deviates from the long term average by more than a certain number, the microprocessor interprets the deviation as motion within the protected zone. Generally the amount of deviation allowed is two or three counts out of a 500 count or approximately a 0.4 percent deviation.

The microprocessor 112 controls the digital gain circuit 134 which is applied to the detected return signal to keep the magnitude of the sampled signal within the desired bounds of the measurement circuit (e.g., preferably in the middle portion of the response range). In so doing, the microprocessor 112 determines whether the measured time period is in the middle portion of the transmitter off period. If the measured time period is above a preset upper limit the microprocessor 112 signals the digital gain control circuit 134 to decrease its gain by a factor of two. This continues on successive samples until the signal falls below the upper limit. Likewise, if the measured time is below a preset lower limit the gain is increased until the amplitude is in the proper range. For purposes of the application described herein, the chosen present upper and lower limits of the measured time period are 228 and 416 clock pulses as counted by the internal timer of microprocessor 112. However, other limits may be utilized. At the same time, the short term recursive averaging process multiplies the resulting time period by the inverse of the gain so as to compensate for any changes in measured time periods that result solely from gain changes. The result is a digital representation of the input signal which is a product of the time period and the inverse of the gain.

If there is motion in the aisle, the microprocessor 112 drives indicator LED1 via transistor Q5 and indicator LED2. Indicator LED1 is turned off when motion is no longer detected. When the aisle is quiet for 3 seconds, as measured by interval timer 160, the microprocessor 112 drives relay K1 via transistor Q6 and de-energizes indicator LED2. The relay switch 120, when closed, enables the shelf motor 122 to activate and move the range.

Figure 9C:
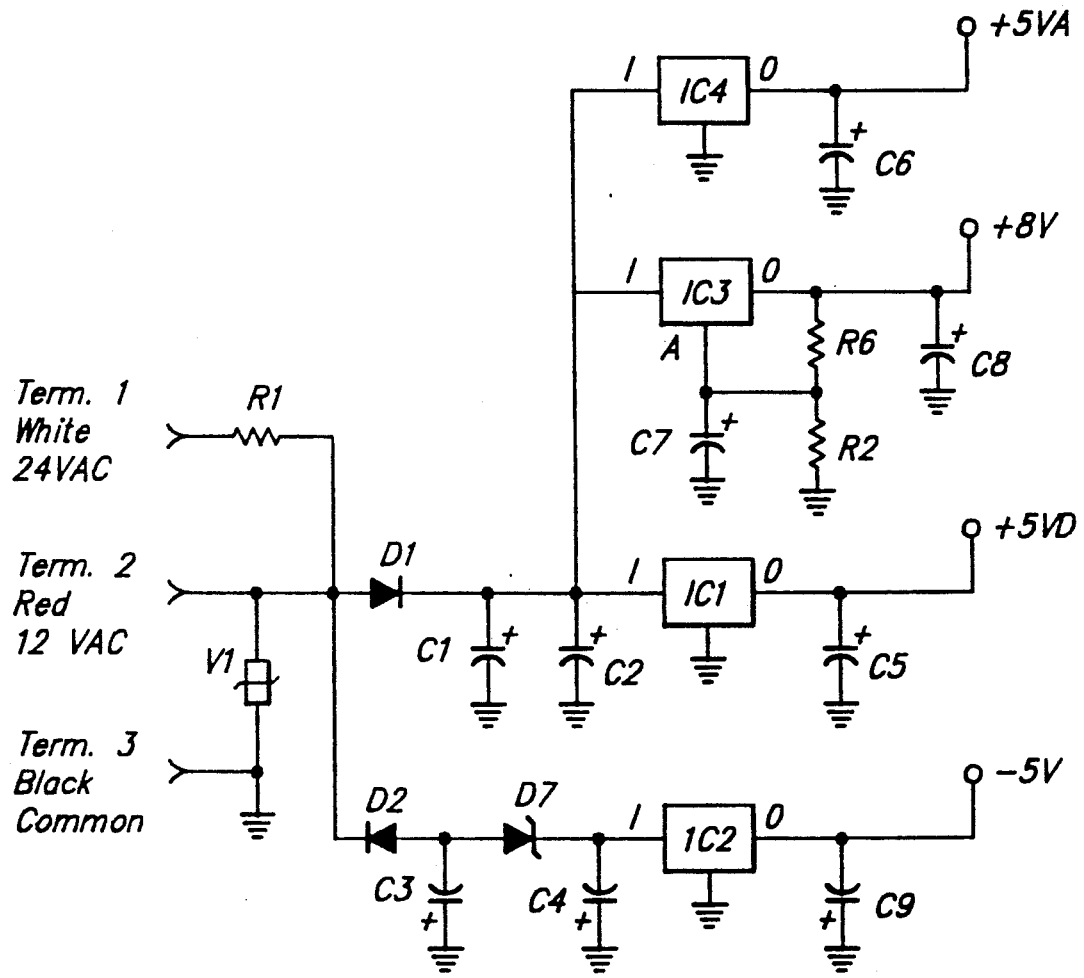
Figure 10A:
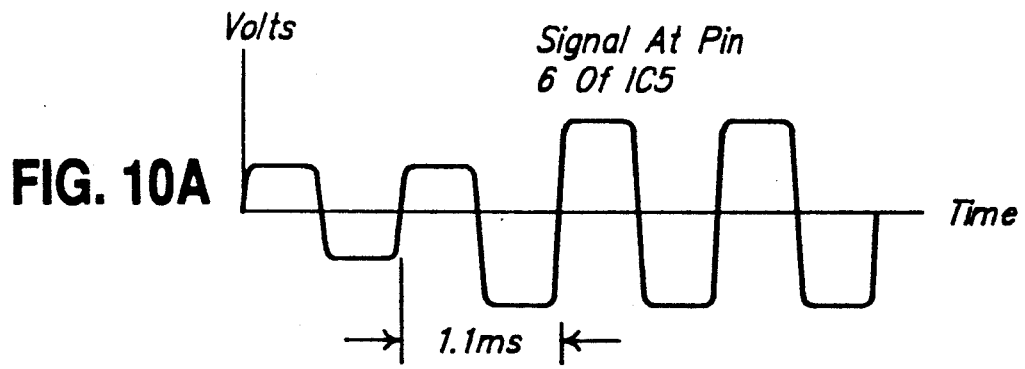
FIGS. 10(A-D) are timing diagrams illustrating within the personnel detector of FIGS. 9A-C a reflected signal from an animate object.
Figure 10B:
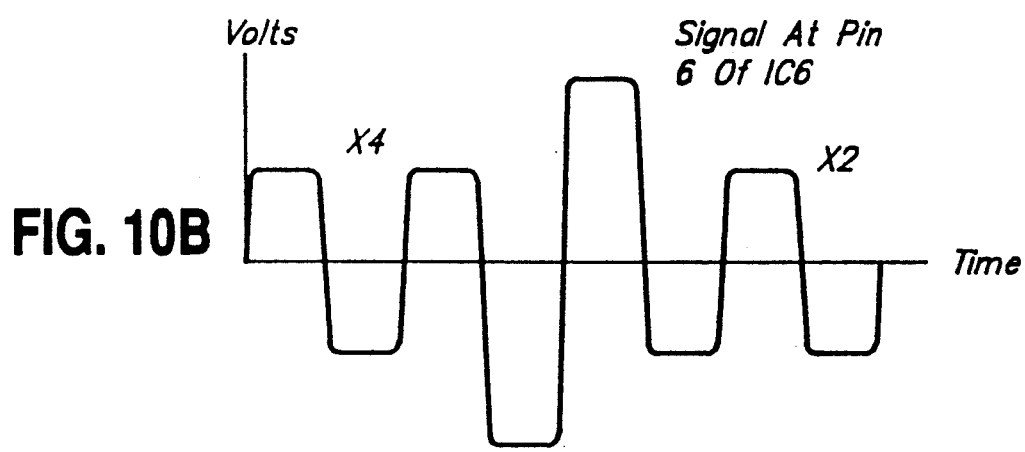
Figure 10C:
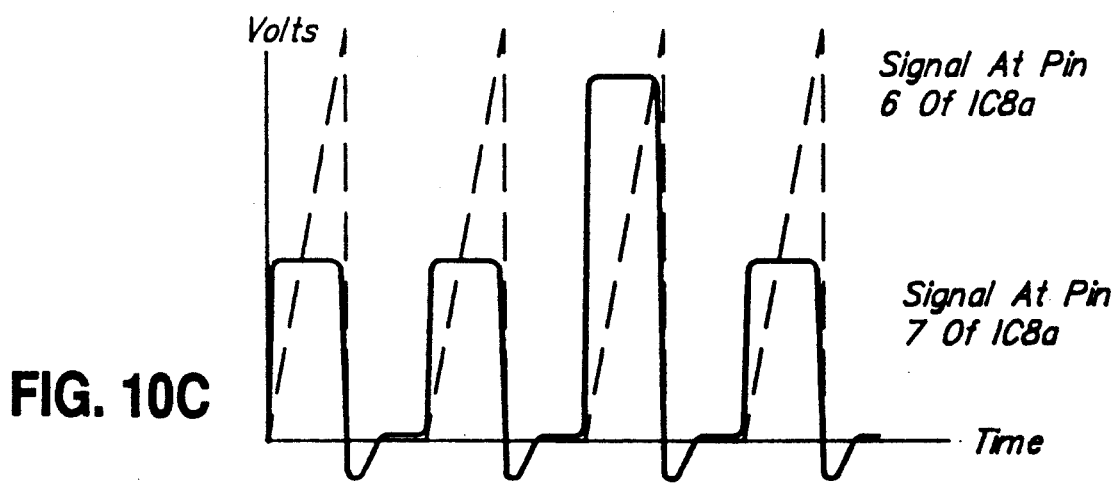
Figure 10D:
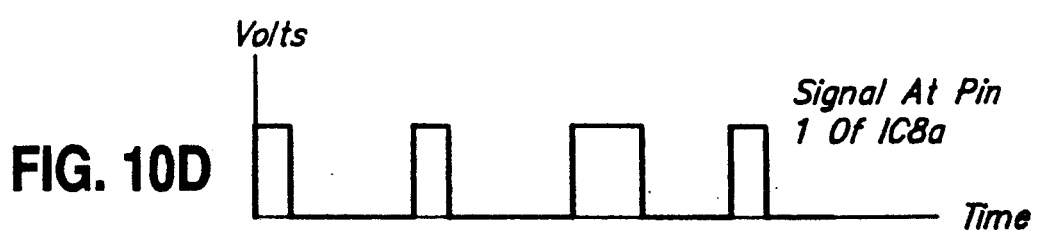

Turning now to FIG. 9C the power supply 150 is shown in more detail. Terminal 1 receives 24 volt AC power, terminal 2 receives 12 volts AC power and terminal 3 is a common which is coupled to ground. Over voltage protection circuit V1 provides noise immunity and over voltage suppression. Resistor R1 is a current limiting resistor.

Negative 5 volt power is supplied via a branch of the power supply 150 which employs diodes D2 and D7, capacitor C3, C4 and C9 and voltage regulator IC2.

Five volt DC power is provided by another branch of the power supply employing diode D1 and capacitor C1, C2, C5 and C6 and voltage regulator circuits IC1 and IC4.

Eight volt DC power is provided by a branch of the power supply which shares diode D1 and capacitor C1 and C2 with the 5 volt power branches but also includes voltage regulator IC3 as well as resistors R2 and R6 and capacitors C7 and C8.

FIGS. 10(A-D) show a timing diagram illustrating a reflected signal from animate objects. Changes in the magnitude of the detected signal due to movement within the field are illustrated in part A. The signal at pin 6 of IC5 shows the detected signal doubling on the third pulse due to a change in twice the magnitude of the signal detected, resulting from movement within the monitored zone. Part B illustrates the effects of applying the digital gain to the detected signal. When the amplitude of the third pulse exceeds the preset upper limit of the measurement circuit, the digital gain divides the signal by a factor of two, as shown on the fourth pulse. Part C illustrates the voltage ramp in comparison to the amplified detected signal. The microprocessor 112 measures the time it takes the ramp voltage to reach the detected signal. These corresponding measured time periods are illustrated in part D.

As discussed above, FIGS. 4A and 4B shown the beam pattern 52 for the field disturbance monitor system 110, which may be mounted to the top of the ranges 14 or on a rail from the ceiling in a position midway between two ranges 14 in the open position. The beam extends from one end of the range 14 to the other end. The length of the beam 52 may be adjusted by varying the resistance R7 in the variable gain pre-amp 132.

As shown in the side view of FIG. 4B, the beam pattern 52 covers the aisle sufficiently to sense any animate objects in the aisle. A reflector or deflector 56 may be mounted on the monitor 110 (e.g., at a 118 degree angle) to direct the beam's coverage. The receiver and transmitter may be located side-by-side or located separate from each other anywhere within or around the detection field.

Turning now to FIGS. 11A-E, there are shown flowcharts for the routines and sub-routines performed by the microprocessor 112. When powered-on, the microprocessor 112 undergoes an initialization process. Initialization includes setting up all chip, timer and serial control ports, clearing on-chip random access memory (RAM) and setting the stack pointer to the top of the used area. During this time, data samples are flagged as "unknown". The relay output at pin 28 of the microprocessor 112 is turned on and the timer and all general interrupts are enabled. Finally, the timer, which counts sample interrupt periods to time how long the data has been stable, is reset.

Figure 11E:
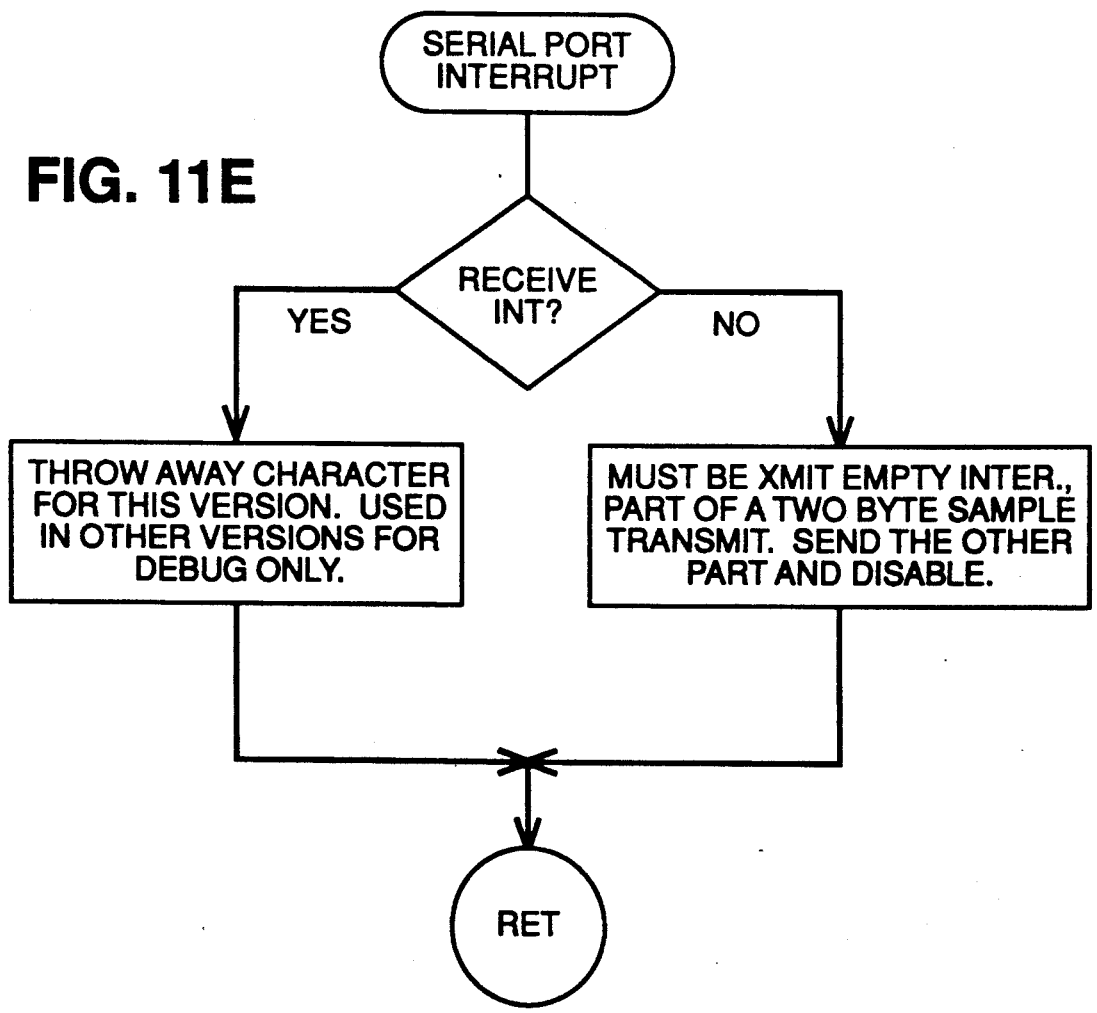
FIG. 11E is a continued flow diagram of the software for the personnel detector.
Figure 11A:
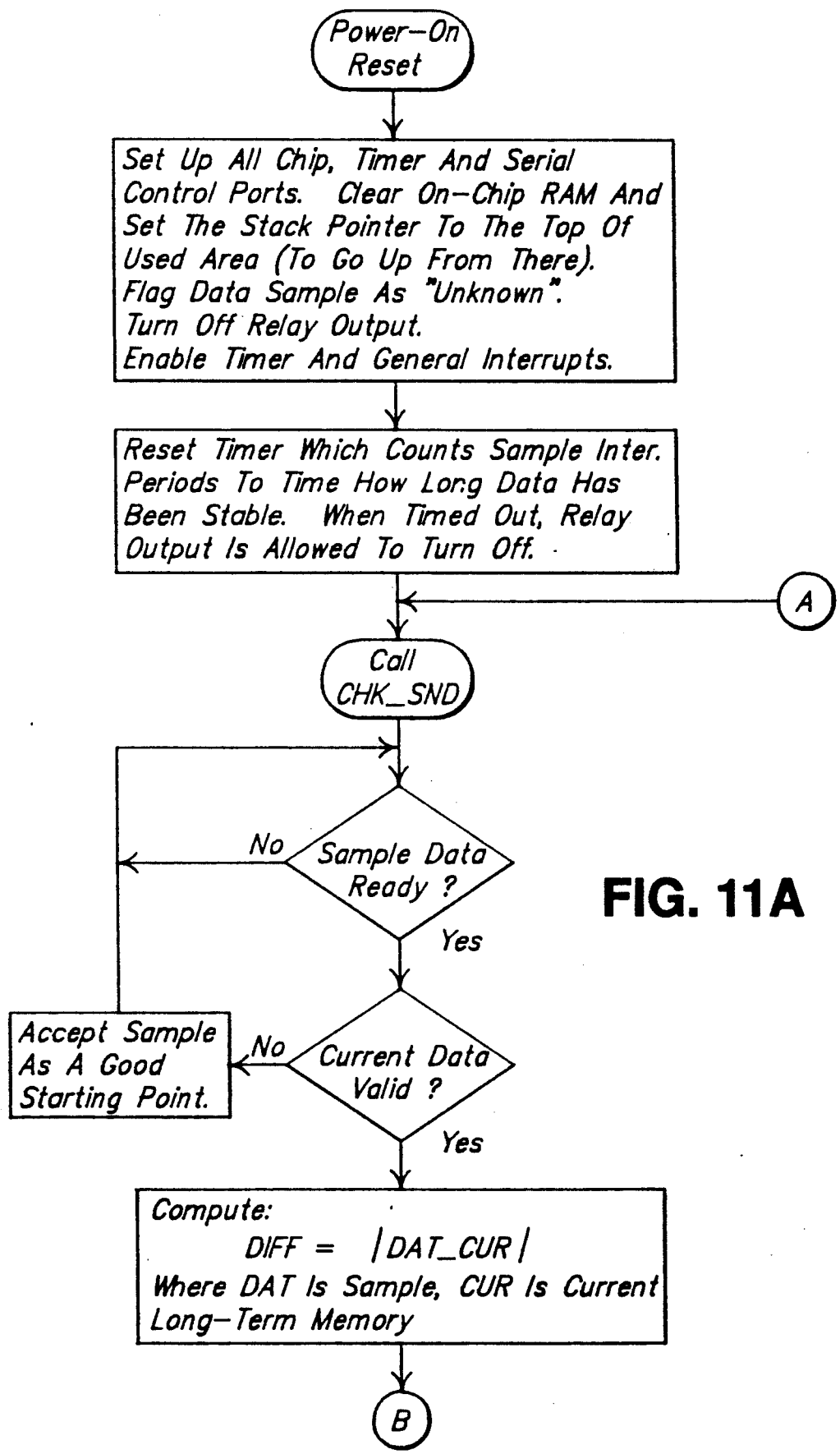
FIG. 11A is a flow diagram of the software for the personnel detector of FIGS. 9A-C.
Figure 11B:
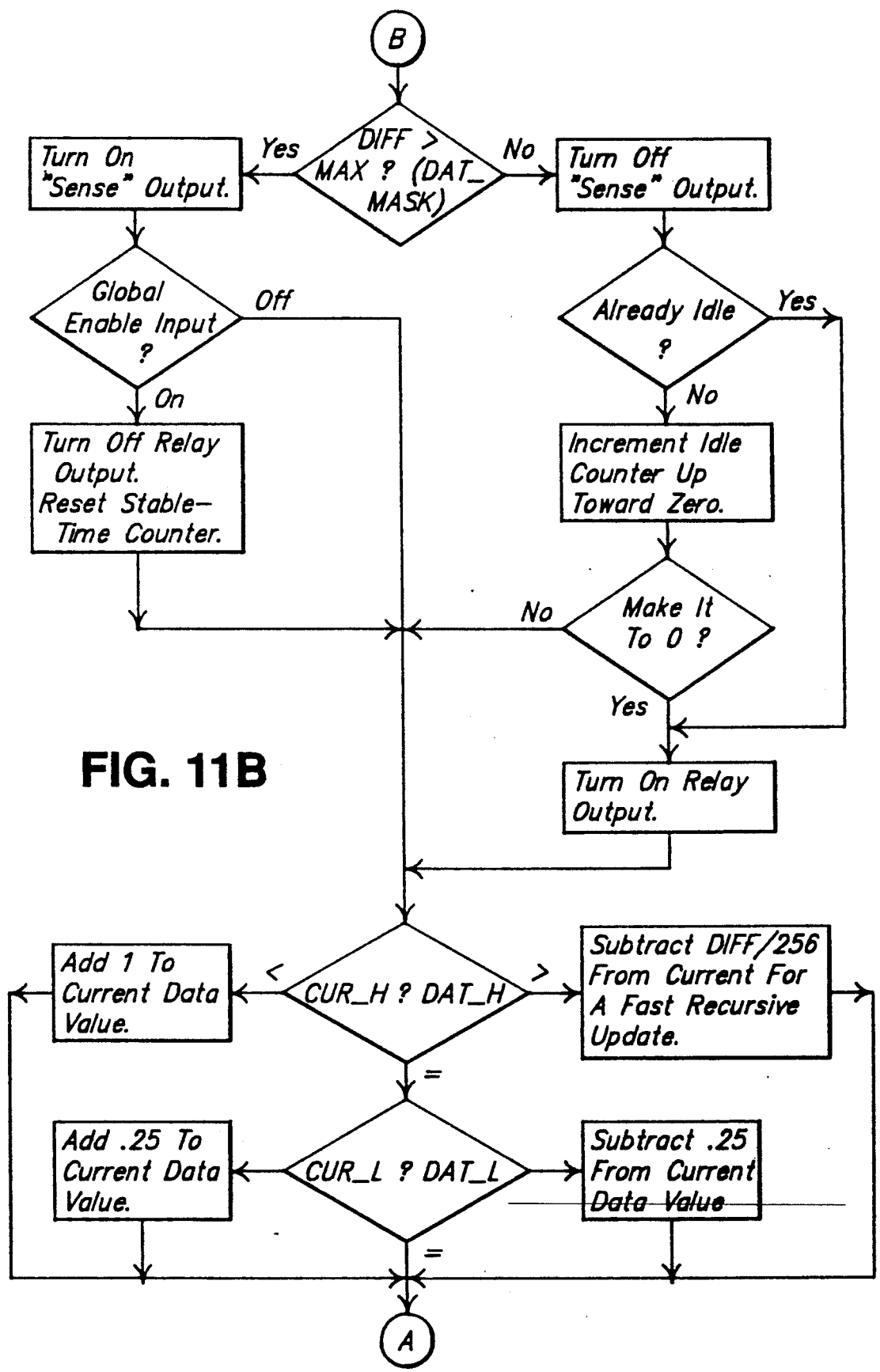
FIG. 11B is a continued flow diagram of the software for the personnel detector.

As shown in FIGS. 11A and 11B, sample data is received and compared with the current long-term memory. If the difference compared is greater than a reference value (MAX), then the relay is turned off and a stable time counter is reset. If the difference compared is less the reference value (MAX), then the relay output is turned on only after the stable time counter has timed out, thereby indicating a motionless field for certain amount of time. If the sample changes, the current long-term memory undergoes a process of adjusting to the sample value, whereby an increase of 0.25 is added to the current long-term memory for small increases and 1.0 for large increases. For decreases, 0.25 is subtracted for small decreases while a fast recursive update is available for large decreases. The current long-term memory essentially performs a recursive tracking process. This large decrease allows a system to self-adjust quickly after an aisle has been created or other changes have been made within the field.

Figure 11C:
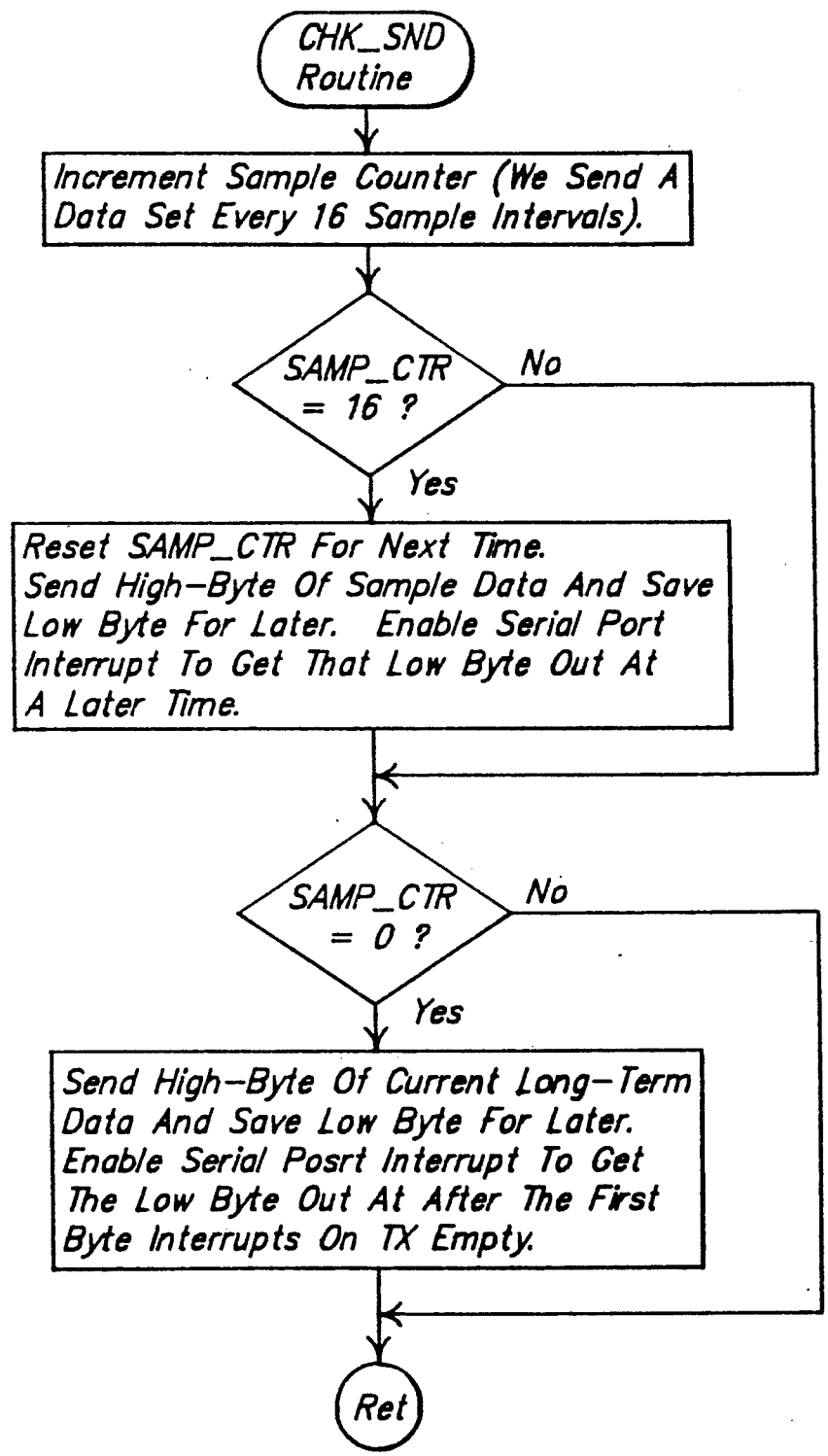
FIG. 11C is a continued flow diagram of the software for the personnel detector.

The check send (CHK-SND) routine shown in FIG. 11C is called upon to see if it is time to send a sample set out via the serial interface. The check send routine begins by incrementing the sample counter, such that a data set is sent out every 16 sample intervals. If the sample counter (SAM-CTR) equals 116 then the sample counter is rest for the next time.

Figure 11D:
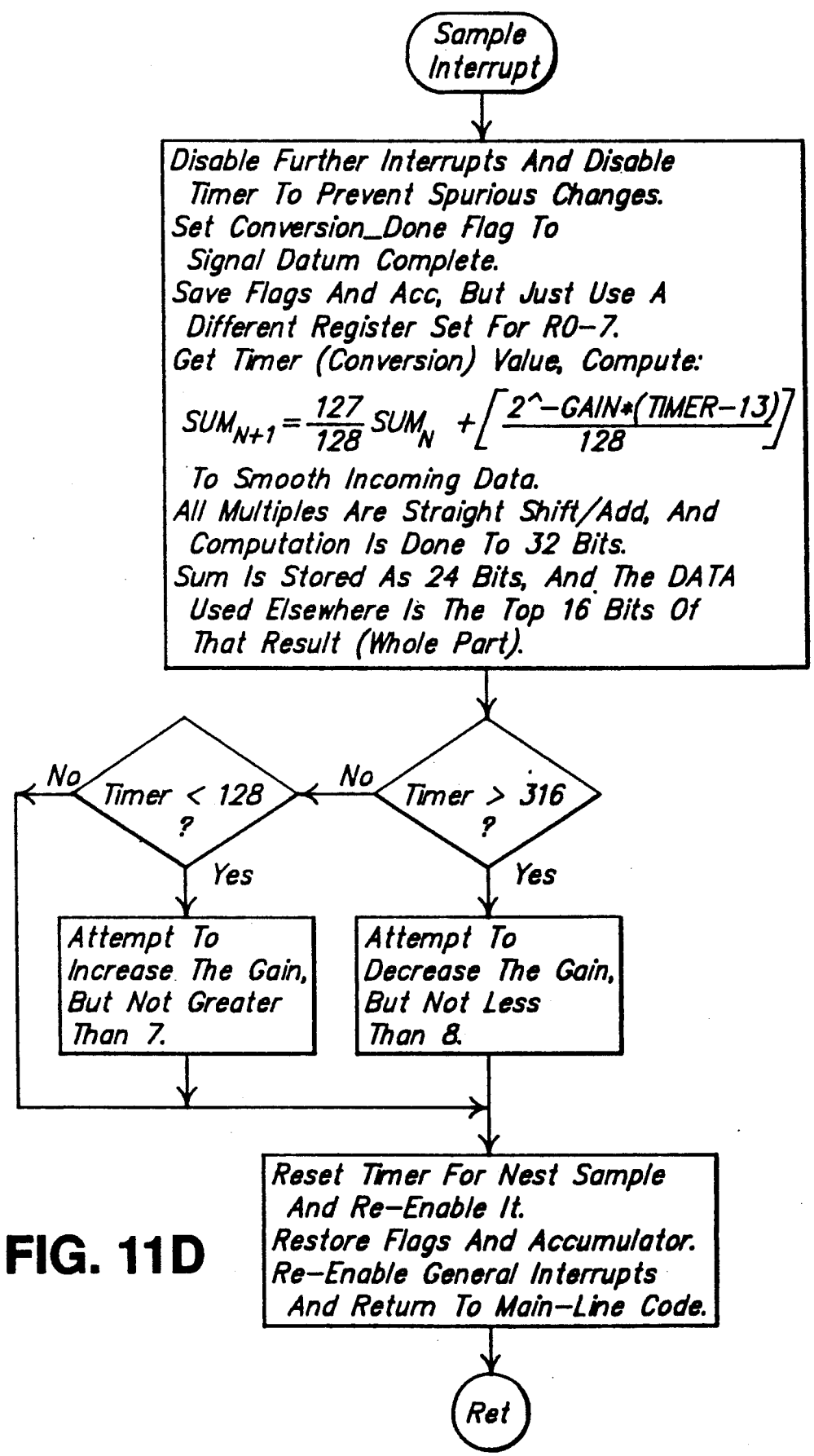
FIG. 11D is a continued flow diagram of the software for the personnel detector.

FIG. 11D shows the sample interrupt routine. This routine provides the proper adjustment on the gain and timer. When the measured time period exceeds the present upper limit (416 counts) or falls below the preset lower limit (228 counts), the gain is adjusted accordingly. In addition, the faster recursive averaging process is continuously applied.

FIG. 11E shows a serial port interrupt routine.

Certain changes and modifications of the embodiments of the invention herein disclosed will be readily apparent to those of skill in the art. It is the applicants, intention to cover by the claims all those changes and modifications which could be made to the embodiments of the invention herein chosen for the purposes of disclosure which do not depart from the spirit and scope of the invention.

| Representative Element Values | | | |
|---|---|---|---|
| R1 | 5.1/5 W | C1 | 2200µ |
| R2 | 1.5K | C2 | .1µ |
| R3 | 10K | C3 | 1000µ |
| R4 | 220K | C4 | .1µ |
| R5 | 220 | C5 | 10µ |
| R6 | 270 | C6 | 10µ |
| R7 | 50K | C7 | 4.7µ |

-continued

| Representative Element Values | | | |
|---|---|---|---|
| R8 | 10K | C8 | 1µ |
| | | C9 | 10µ |
| | | C10 | 33µ |
| | | C11 | 10µ |
| R12 | 10K | C12 | 1µ |
| | | C13 | 27 p |
| R14 | 5.1K | C14 | 1µ |
| R15 | 5.1K | C15 | 1µ |
| R16 | 5.1K | C16 | 1µ |
| | | C17 | .1µ |
| | | C18 | .1µ |
| R19 | 5.1K | C19 | .1µ |
| R20 | 1K | C22 | .1µ |
| R21 | 10K | C23 | .0047 |
| R22 | 470 | C24 | .001µ |
| R23 | 100K | C25 | .47µ |
| R24 | 100K | C26 | 100µ |
| R25 | 47K | C27 | 220µ |
| R26 | 270 | C28 | 220µ |
| R27 | 1K | IC1 | 7805 |
| R28 | 1K | IC2 | 7905 |
| R29 | 10K | IC3 | LM317 |
| R30 | 5.1K | IC4 | 7805 |
| R31 | 10K | IC5, 6, 7, | NE5534 |
| R32 | 47K | IC8 | LM2901 |
| | | IC9 | LF13006N |
| R34 | 10K | IC10 | 74HC4020 |
| R35 | 10K | IC11 | 87C51 |
| R36 | 10K | IC12 | MC14050 |
| R37 | 10K | IC13 | ALS5573 |
| | | IC14 | 5517 |

What is claimed is:

1. A detection system coupled in a storage system having a plurality of storage elements at least one of which is movable to open and close an access aisle adjacent at least one of the storage elements, said detection system comprising:
    means for detecting the movement of a person within an open aisle without direct contact between said detection system and the person.
    means responsive to said movement detecting means for causing said storage system to prevent an open aisle in which said movement detecting means detects movement of a person from being closed by movement of a storage element adjacent that open aisle.

2. The detection system of claim 1 wherein said movement detecting means is operative to detect movement of a live person in an open aisle who is stationary.

3. The detection system of claim 1 wherein said movement detecting means includes means defining a field of detection in an open aisle in which field said movement detecting means detects movement of a person, said field of detection defining means being located at a sufficient height above a floor surface on which a person walks so as not to interfere with ordinary movements of the person in an open aisle when accessing a storage element adjacent that open aisle.

4. The detection system of claim 1 wherein said movement detecting means comprises means for emitting radiation into an open aisle, means for receiving emitted radiation reflected from a person within that open aisle and means for processing signals related to the emitted and received radiation for detecting movement of a person within that open aisle.

5. The detection system of claim 4 wherein said radiation emitting means and said radiation receiving means emits and receives, respectively, microwave electromagnetic energy.

6. In a storage system having a plurality of storage elements at least one of which is movable to open and close an access aisle adjacent at least one of the storage elements, a detection system comprising:
 means for detecting the movement of a person within an open aisle without direct contact between said detection system and the person,
 means responsive to said movement detecting means coupled to said storage system to cause said storage system to prevent an open aisle in which said movement detecting means detects movement of a person from being closed by movement of a storage element adjacent that open aisle.

7. The system of claim 6 wherein said movement detecting means is operative to detect movement of a live person in an open aisle who is stationary.

8. The storage system of claim 6 wherein said movement detecting means includes means defining a field of detection in an open aisle in which field said movement detecting means detects movement of a person, said field of detection defining means being located a sufficient height above a floor surface on which a person walks so as not to interfere with ordinary movements of the person in an open aisle when accessing a storage element adjacent that open aisle.

9. The storage system of claim 6 wherein said movement detecting means comprises means for emitting radiation into an open aisle, means for receiving emitted radiation reflected from a person within that open aisle and means for processing signals related to the emitted and received radiation for detecting movement of a person within that open aisle.

10. The storage system of claim 9 wherein said radiation emitting means and said radiation receiving means emits and receives, respectively, microwave electromagnetic energy.

11. In a storage system having a plurality of storage elements at least one of which is movable to open and close an access aisle adjacent at least one of the storage elements, a detection system comprising:
 means for detecting the presence of a live person who is stationary and does not move his limbs within a field of detection an open aisle, and
 means responsive to said presence detecting means coupled to said storage system to cause said storage system to prevent an open aisle from being closed by movement of a storage element adjacent that open aisle when said presence detecting means detects the presence of a person in that open aisle.

12. The storage system of claim 11 wherein movement of a person is detected by said detection system without physical contact between said system and the person.

13. The storage system of claim 11 wherein said presence detecting means comprises means for emitting radiation into an open aisle, means for receiving emitted radiation reflected from a person within that open aisle and means for processing signals related to the emitted and received radiation for detecting the presence of a breathing person within that open aisle.

14. The storage system of claim 13 wherein said radiation emitting means and said radiation receiving means emits and receives, respectively, microwave electromagnetic energy.

15. The storage system of claim 14 wherein said presence detecting means comprises a radar system.

16. The storage system of claim 15 wherein said field of detection defining means comprises an antenna, and said presence detecting means comprises for each aisle that may be opened a combined radar transmitter and receiver including a said antenna.

17. The storage system of claim 16 wherein said field of detection means comprises a radar signal deflector disposed adjacent each said antenna for shaping the field in which radar signals are emitted.

18. The system of claim 17 wherein said radar system operates in the microwave frequency spectrum.

19. A method for preventing an open access aisle in a storage system having a plurality of storage elements at least one of which is movable from closing when a person is in the open aisle, said method comprising the steps of:
 employing a personnel detector to detect the presence of a person within an open aisle without direct contact between the detector and the person, and
 preventing the storage system from closing that open aisle when the presence of a person is detected therein by the presence detector.

20. The method of claim 19 wherein the step of employing a personnel detector comprises employing one which uses radiated energy to detect a person's presence.

21. The method of claim 19 including the step of preventing an open aisle from being closed for a predetermined time after the presence of a person is detected in the open aisle.

22. The method of claim 21 wherein the predetermined time period is from about 1 to about 10 seconds.

23. The method of claim 19 comprising the step of activated the personnel detector for a given aisle only while the aisle is fully open.

* * * * *